US011340567B2

(12) United States Patent
Behandish et al.

(10) Patent No.: US 11,340,567 B2
(45) Date of Patent: May 24, 2022

(54) SYSTEM AND METHOD FOR DETERMINING MANUFACTURABILITY AND PROCESS PLANNING FOR HYBRID MANUFACTURING USING SYMBOLIC, LOGICAL, AND/OR COMBINATORIAL REPRESENTATIONS

(71) Applicant: Palo Alto Research Center Incorporated, Palo Alto, CA (US)

(72) Inventors: Morad Behandish, Mountain View, CA (US); Saigopal Nelaturi, Mountain View, CA (US); Johan de Kleer, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 7 days.

(21) Appl. No.: 17/069,087

(22) Filed: Oct. 13, 2020

(65) Prior Publication Data

US 2022/0113689 A1 Apr. 14, 2022

(51) Int. Cl.
*G05B 19/04* (2006.01)
*G06F 30/10* (2020.01)

(52) U.S. Cl.
CPC ........... *G05B 19/041* (2013.01); *G06F 30/10* (2020.01); *G05B 2219/13167* (2013.01)

(58) Field of Classification Search
None
See application file for complete search history.

(56) References Cited

U.S. PATENT DOCUMENTS

| | | | |
|---|---|---|---|
| 10,359,764 | B1 | 7/2019 | Nelaturi et al. |
| 10,719,069 | B2 | 7/2020 | Behandish et al. |
| 2019/0351621 | A1 | 11/2019 | Nelaturi et al. |
| 2020/0209834 | A1 | 7/2020 | Behandish et al. |
| 2020/0319628 | A1 | 10/2020 | Behandish et al. |

OTHER PUBLICATIONS

European Search Report for EP 21200373.5 issued by the European Patent Office dated Mar. 17, 2022; 18 pgs.
Allada et al., "Feature-Based Modelling Approaches for Integrated Manufacturing: State-of-The-Art Survey and Future Research Directions," International Journal of computer Integrated Manufacturing, Taylor and Francis, Basingstoke, GB, Nov. 1, 1995;vol. 8. No. 6: 411-440.
Behandish et al., "Automated Process Planning for Hybrid Manufacturing," Arxiv. Org, Cornell University Library, 201 Olin Library Cornell University, Ithaca, NY 14853, May 18, 2018: 15 pgs.

*Primary Examiner* — Carlos R Ortiz Rodriguez
(74) *Attorney, Agent, or Firm* — Mueting Raasch Group

(57) ABSTRACT

A computer is provided with a geometric representation of an as-designed part and a set of hybrid manufacturing capabilities. The computer computes a set of additive and subtractive manufacturing primitives from the provided set of hybrid manufacturing capabilities, and intersects the primitives to generate an atomic decomposition of space. The computer uses the atomic decomposition to generate a non-geometric representation of a space of manufacturable parts with hybrid manufacturing capabilities in at least one of symbolic, logical, and combinatorial forms. At least one of a necessary, sufficient, or necessary-and-sufficient condition for manufacturability is tested via examining the non-geometric representation for the existence of at least one feasible process plan whose outcome is an as-manufactured part that is interchangeable with the as-designed part.

19 Claims, 39 Drawing Sheets

Read-once sequences of AM/SM actions $S_M = (A_{0100} \cup^* A_{1000} \cup^* A_{1100})$.

Active nonempty atoms

Once conjunctive clause per atom:

$A_{0100} = (\overline{P}_1 \cap^* P_2 \cap^* \overline{P}_3 \cap^* \overline{P}_4)$, $A_{1000} = (P_1 \cap^* \overline{P}_2 \cap^* \overline{P}_3 \cap^* \overline{P}_4)$, $A_{1100} = (P_1 \cap^* P_2 \cap^* \overline{P}_3 \cap^* \overline{P}_4)$, 3 valid manufacturing plans:

$E_1[P_1, P_2, P_3, P_4] = (((P_1 \cup^* P_2) \cap^* \overline{P}_3) \cap^* \overline{P}_4)$, $E_2[P_1, P_2, P_3, P_4] = (((P_1 \cup^* P_2) \cap^* \overline{P}_4) \cap^* \overline{P}_3)$, $E_3[P_1, P_2, P_3, P_4] = (((P_1 \cup^* \overline{P}_4) \cup^* P_2) \cap^* \overline{P}_3)$.

Set membership classification:

Literal assignments, i.e., atom encoding

| $P_1$ | $P_2$ | $P_3$ | $P_4$ | $S_M$ | $E_1$ | $E_2$ | $E_3$ |
|---|---|---|---|---|---|---|---|
| 0 | 0 | 0 | 0 | 0 | 0 | 0 | 0 |
| 0 | 0 | 0 | 1 | 0 | 0 | 0 | 0 |
| 0 | 0 | 1 | 0 | 0 | 0 | 0 | 0 |
| 0 | 0 | 1 | 1 | * | 0 | 0 | 0 |
| 0 | 1 | 0 | 0 | 1 | 1 | 1 | 1 |
| 0 | 1 | 0 | 1 | * | 0 | 0 | 1 |
| 0 | 1 | 1 | 0 | 0 | 0 | 0 | 0 |
| 0 | 1 | 1 | 1 | * | 0 | 0 | 0 |
| 1 | 0 | 0 | 0 | 1 | 1 | 1 | 1 |
| 1 | 0 | 0 | 1 | 0 | 0 | 0 | 0 |
| 1 | 0 | 1 | 0 | 0 | 0 | 0 | 0 |
| 1 | 0 | 1 | 1 | 0 | 0 | 0 | 0 |
| 1 | 1 | 0 | 0 | 1 | 1 | 1 | 1 |
| 1 | 1 | 0 | 1 | * | 0 | 0 | 1 |
| 1 | 1 | 1 | 0 | 0 | 0 | 0 | 0 |
| 1 | 1 | 1 | 1 | * | 0 | 0 | 0 |

FIG. 18

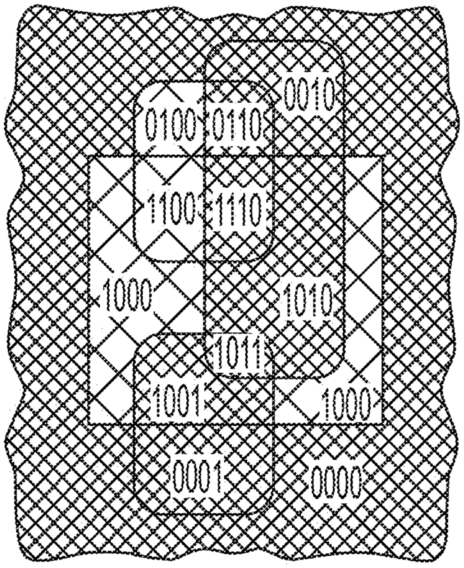

$S_M = (A_{0100} \cup^* A_{1000} \cup^* A_{1100})$.

Active nonempty atoms

Once conjunctive clause per atom:

$A_{0100} = (\overline{P}_1 \cap^* P_2 \cap^* \overline{P}_3 \cap^* \overline{P}_4)$, $A_{1000} = (P_1 \cap^* \overline{P}_2 \cap^* \overline{P}_3 \cap^* \overline{P}_4)$, $A_{1100} = (P_1 \cap^* P_2 \cap^* \overline{P}_3 \cap^* \overline{P}_4)$.

Substitute

Minimal DNF (no *empty* atoms):

$$E_0^{\dagger}[\mathbb{P}] = (\overline{P}_1 \cap^* P_2 \cap^* \overline{P}_3 \cap^* \overline{P}_4),$$
$$\cup^* (P_1 \cap^* \overline{P}_2 \cap^* \overline{P}_3 \cap^* \overline{P}_4),$$
$$\cup^* (P_1 \cap^* P_2 \cap^* \overline{P}_3 \cap^* \overline{P}_4).$$

3 valid manufacturing plans:

$$E_1[P_1, P_2, P_3, P_4] = (((P_1 \cup^* P_2) \cap^* \overline{P}_3) \cap^* \overline{P}_4),$$
$$E_2[P_1, P_2, P_3, P_4] = (((P_1 \cup^* P_2) \cap^* \overline{P}_4) \cap^* \overline{P}_3),$$
$$E_3[P_1, P_2, P_3, P_4] = (((P_1 \cap^* \overline{P}_4) \cup^* P_2) \cap^* \overline{P}_3).$$

FIG. 19

| | | |
|---|---|---|
| C(m,0) = 1 | x | Minimal DNF (0 empty atom) |
| C(m,1) = m | x | 1-enriched DNFs (1 empty atom) |
| C(m,2) = m(m−1) | x | 2-enriched DNFs (2 empty atoms) |
| C(m,3) = m(m−1)(m−2) | x | 3-enriched DNFs (3 empty atoms) |

Total of O(2^m) possible DNFs with the same geometric outcome for m = number of empty atoms = O(2^n).

↓ Golumbic et al.'s algorithm to map DNF to read-once using clique-finding and cographs → cotrees.

Check validity $E_1[P_1, P_2, P_3, P_4] = (((P_1 \cup^* P_2) \cap^* \overline{P}_3) \cap^* \overline{P}_4)$, → Valid $E_2[P_1, P_2, P_3, P_4] = (((P_1 \cup^* P_2) \cap^* \overline{P}_4) \cap^* \overline{P}_3)$, → Valid $E_3[P_1, P_2, P_3, P_4] = (((P_1 \cap^* \overline{P}_4) \cup^* P_2) \cap^* \overline{P}_3)$, → Valid $E_4[P_1, P_2, P_3, P_4] = ((P_1 \cup^* P_2) \cap^* (\overline{P}_4 \cap^* \overline{P}_3))$, → Invalid (because not anti-balanced)

FIG. 22

$E_1[P_1, P_2, P_3, P_4] = (((P_1 \cup^* P_2) \cap^* \overline{P}_3) \cap^* \overline{P}_4), \longrightarrow P_1 \prec P_2 \prec P_3 \prec P_4,$ $E_2[P_1, P_2, P_3, P_4] = (((P_1 \cup^* P_2) \cap^* \overline{P}_4) \cap^* \overline{P}_3), \longrightarrow P_1 \prec P_2 \prec P_4 \prec P_3,$ $E_3[P_1, P_2, P_3, P_4] = (((P_1 \cap^* \overline{P}_4) \cup^* P_2) \cap^* \overline{P}_3). \longrightarrow P_1 \prec P_4 \prec P_2 \prec P_3.$

FIG. 23

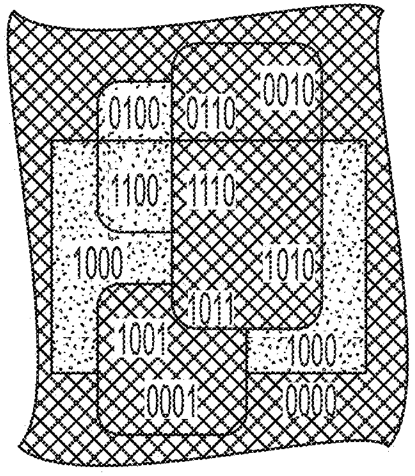

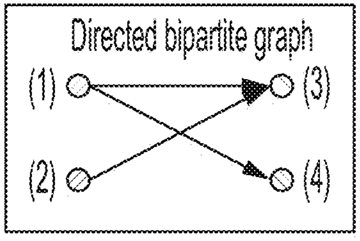

Set membership classification:

| $P_1$ | $P_2$ | $P_3$ | $P_4$ | $S_M$ | $E_1$ | $E_2$ | $E_3$ | Declarative specification of valid plans (to be compiled to plans) |
|---|---|---|---|---|---|---|---|---|
| 0 | 0 | 0 | 0 | 0 | 0 | 0 | 0 | — Note: There is an "and" between all of the lines |
| 0 | 0 | 0 | 1 | 0 | 0 | 0 | 0 | — |
| 0 | 0 | 1 | 0 | 0 | 0 | 0 | 0 | — |
| 0 | 0 | 1 | 1 | * | 0 | 0 | 0 | |
| 0 | 1 | 0 | 0 | 1 | 1 | 1 | 1 | — $P_2$ is used; |
| 0 | 1 | 0 | 1 | * | 0 | 0 | 1 | |
| 0 | 1 | 1 | 0 | 0 | 0 | 0 | 0 | — If $P_2$ is used then [$P_3$ is used and ($P_2 \prec P_3$)]; |
| 0 | 1 | 1 | 1 | * | 0 | 0 | 0 | |
| 1 | 0 | 0 | 0 | 1 | 1 | 1 | 1 | — If $P_1$ is used; |
| 1 | 0 | 0 | 1 | 0 | 0 | 0 | 0 | — If $P_1$ is used then [$P_4$ is used and ($P_1 \prec P_4$)]; |
| 1 | 0 | 1 | 0 | 0 | 0 | 0 | 0 | — If $P_1$ is used then [$P_3$ is used and ($P_1 \prec P_3$)]; |
| 1 | 0 | 1 | 1 | 0 | 0 | 0 | 0 | — If $P_1$ is used then [$P_3$ is used and ($P_1 \prec P_3$)]; or [$P_4$ is used and ($P_1 \prec P_4$)]; |
| 1 | 1 | 0 | 0 | 1 | 1 | 1 | 1 | — $P_1$ is used or $P_2$ is used; |
| 1 | 1 | 0 | 1 | * | 0 | 0 | 1 | |
| 1 | 1 | 1 | 0 | 0 | 0 | 0 | 0 | — If $P_1$ is used then [$P_3$ is used and ($P_1 \prec P_3$)]; |
| 1 | 1 | 1 | 1 | * | 0 | 0 | 0 | — If $P_2$ is used then [$P_3$ is used and ($P_2 \prec P_3$)]; |

FIG. 25

SYSTEM AND METHOD FOR DETERMINING MANUFACTURABILITY AND PROCESS PLANNING FOR HYBRID MANUFACTURING USING SYMBOLIC, LOGICAL, AND/OR COMBINATORIAL REPRESENTATIONS

STATEMENT REGARDING FEDERALLY SPONSORED RESEARCH OR DEVELOPMENT

This invention was made with government support under contract number HR0011-17-2-0030 awarded by Defense Advanced Research Projects Agency (DARPA). The government has certain rights in the invention.

SUMMARY

The present disclosure is directed to a system and method for determining hybrid manufacturability based on partial ordering of manufacturing primitives. In one embodiment, a computer is provided with a non-geometric representation of a space of manufacturable parts with hybrid manufacturing capabilities in at least one of symbolic, logical, and combinatorial forms. At least one of a necessary, sufficient, or necessary-and-sufficient condition for manufacturability is tested via examining the non-geometric representation for the existence of at least one feasible process plan whose outcome is an as-manufactured part that is interchangeable with the as-designed part. The at least one feasible process plan is communicated to a manufacturing apparatus to produce the as-manufactured part.

In another embodiment, a computer is provided with a geometric specification of an as-designed part and a set of hybrid manufacturing capabilities. The computer computes manufacturing primitives for each of the hybrid manufacturing capabilities. Each manufacturing primitive includes a region of influence that is manufacturable through a single manufacturing action that can be performed by one of the hybrid manufacturing capabilities. The manufacturing primitives are combined via set operations to obtain a decomposition of space into atoms that are classified in terms of their inclusion against the manufacturing primitives. A non-geometric representation of a space of manufacturable parts is produced by the computer that can be manufactured by the hybrid manufacturable capabilities in at least one of symbolic, logical, and combinatorial forms.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

FIG. 18 is a diagram representing how an as-manufactured part may be represented symbolically by a disjunction of atoms where each atom is a conjunction of primitives or their complements, three valid process plans that produce the same as-manufactured part, and a table showing how each of them are encoded as binary strings;

FIG. 19 is a diagram showing how substitution of symbolic expressions in FIG. 17 for nonempty atoms produces a minimal disjunctive normal form (DNF) that is logically equivalent to only two out of three valid process plans;

FIG. 22 is a diagram showing how minimal and enriched DNFs of FIGS. 19, 20, and 21 may be mapped to read-once Boolean formulas representing process plans using standard Boolean function learning algorithms in one possible embodiment;

FIG. 23 is a diagram showing how three different process plans represented by read-once Boolean formulas may also be represented by total orders in another possible embodiment;

FIG. 25 is a diagram showing how the partial order constraints for an as-manufactured part represented by active and inactive atoms can be represented by a directed bi-partite graph, and how the classification of nonempty atoms against primitives and as-manufactured part can be converted to a declarative specification of process plans;

DETAILED DESCRIPTION

Figure 1:
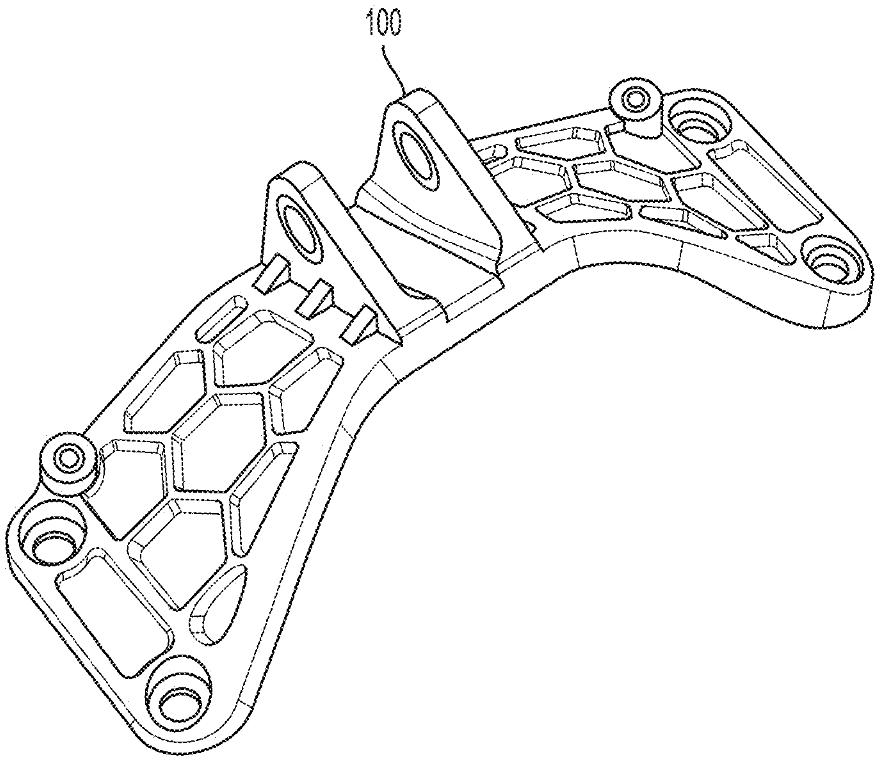
FIG. 1 illustrates a functional mechanical part (e.g., a bracket) that may be manufactured by additive and subtractive manufacturing (AM/SM) processes, each with a different set of pros and cons.

The present disclosure relates to hybrid manufacturing process planning. Hybrid manufacturing relates to a process of manufacturing that combines two different process types or "modalities" usually performed on distinctly different machines, such as (a) additive manufacturing (AM) including three-dimensional (3D) printing, selective laser melting/sintering, laser cladding, welding, and many others; (b) subtractive manufacturing (SM) including turning, milling, drilling, sawing, cutting, and many others; and (c) deformation-based manufacturing such as bending, etc. AM is capable of forming complex structures with customized material gradation, such as complex and efficient infill structures. SM is useful for producing high-precision mechanical parts with controlled surface roughness. Although AM affords wide freedom in customizing the internal structures of parts, SM can achieve finer precision and surface quality specifications than currently possible with AM, such as needed for functional interfaces requiring high-tolerance fit and assembly.

Historically, the manufacturing of parts from raw stock has involved these two distinct, albeit combinable, manufacturing processes. Fabricating a part through SM involves progressively removing or machining material from raw stock until the part has been reduced to the desired form within a specified tolerance. The material is often removed by a moving tool, including turning, milling, drilling, among many others. Fabricating a part through AM, on the other hand, involves progressively adding or depositing material onto a part being fabricated, often by adding successive layers of material extruded through a moving nozzle or melted/sintered by a moving laser on a powder bed, until the part approximates an intended shape and size.

For instance, metal AM is sometimes used in lieu of traditional metalworking, such as casting, but with more freedom in generating complex forms, to produce a near-net shape that is close enough to the final part. Functional interfaces may still be finished using SM to satisfy tolerancing and surface quality specifications. In many cases, in layer-by-layer AM processes such as fused deposition modeling (FDM), support materials are printed into the lower layers of the near-net shape, allowing the upper layers to extend beyond the lower layers' width without sagging due to gravity. This may require SM post-processing to remove the support materials. See, for example, commonly owned U.S. Pat. No. 10,359,764.

Process plans that contain unimodal manufacturing sequences, e.g., sequences comprising either AM-only or SM-only processes, have state transitions that may include a partial ordering in terms of set inclusion. This means that every state of the evolving part, represented by a 3D pointset, either includes (for AM-only sequences) or is included within (for SM-only sequences) the preceding states in a unimodal sequence. More intuitively, at each intermediate state of manufacturing, the physical space occupied by the part being fabricated either increases or decreases monotonically in size and occupied volume. The final outcome of the operations that model the monotonic material deposition (AM-only) or removal (SM-only) of such sequences is therefore insensitive to permutations, that is, same steps applied in different orders, even though the intermediate states and the cost associated with them may vary.

Manufacturability analysis and process planning for combined and multimodal AM/SM processes, hereafter called "hybrid" manufacturing (HM), is significantly more challenging compared to unimodal (AM-only or SM-only) manufacturing. There are multiple reasons for this including the vast geometric freedom (hence complexity) when the same regions of 3D space can be added and removed in numerous different ways to construct a new part. There are also logical complications, since multimodal processes are neither monotonic nor permutative, e.g., the workpiece does not progressively get closer to the final shape (by addition/removal of material) and the order in which the same actions are applied matters to determine the final geometry, unlike the unimodal processes. In a multimodal process, the shape of intermediate states may temporarily move away from the target shape for various reasons ranging from cost saving to improving accessibility or support structure requirements for subsequent actions. One may even run into infinite (i.e., never-ending) add/remove loops that are not possible in unimodal sequences due to monotonicity. Moreover, changing the order of the same actions in a multimodal sequence may lead to different final shapes, unlike the case in unimodal sequences due to permutativity.

A commonly-owned U.S. Pat. No. 10,719,069, which is incorporated herein by reference, disclosed a method to decouple the geometric and logical reasoning and formulated the manufacturability analysis and process planning in purely logical terms. This reference also proposed necessary (e.g., weak) conditions for manufacturability and a possible embodiment for solving the process planning as a logical reasoning problem, which does not scale well beyond a certain number of manufacturing actions/tools. In this disclosure, methods to test necessary and/or sufficient (e.g., strong) conditions for hybrid manufacturability are described, as are several more efficient approaches of process planning by symbolic manipulation of the logical formulae.

AM remains in the spotlight of academic research, partly due to its democratization of making and ability to produce complex shapes and graded materials. AM has also shown great promise for industry-strength fabrication. However, it is clear that in foreseeable future, AM will not completely replace SM due to AM's inability to produce high-precision surfaces (that are currently produced by SM) for assembly interfaces, and the lack of predictive models for the resulting material properties as a function of AM process physics (e.g., temperature history). SM remains central to making many industrial and mission-critical parts because of its precision, quality, reliability, and (in some cases) lower cost. Therefore, the near future of parts manufacturing will be hybrid to achieve the best of both AM and SM. HM machines incorporating both AM and SM modalities enable seamless switching between material deposition and removal. Design for hybrid manufacturing (DfHM) is a next frontier for important and exciting industry-strength geometric modeling, and there are substantial challenges. Existing methods and software systems for unimodal (AM-only or SM-only) process planning cannot be readily extended to multi-modal HM due to the absence of monotonicity or permutativity of AM/SM operations with one another. Limited scalability and interoperability of process planning tools is of prime importance in industrial workflows, despite receiving less attention than deserved in research and development. Incorporating HM process planning within industrial workflows with minimal disruption is key to adoption of HM.

This disclosure presents an approach to HM planning that decouples geometric and physical reasoning from manufacturing process planning, the latter defined as determining whether a sequence of AM and SM actions exists to produce a target part, and finding at least one such sequence that is cost-effective. The decoupling is done in a way that the process planning can be completely re-stated in symbolic terms using a purely logical representation of the constraints. By doing so, one can solve the process planning problem using logic-based algorithms that need not depend on geometric representations.

In FIG. 1, a functional mechanical part (e.g., a bracket 100) is shown, for which using AM-only or SM-only processes would yield suboptimal results. AM is good for scaffolding a near-net shape that can be subsequently finished by SM, resulting in less material waste compared to traditional manufacturing in which the SM starts from a raw stock. AM is also great for generating complex structures and material layout obtained by generative design (e.g., shape, topology, and material optimization) algorithms. However, some AM processes have limited material options and need support structures. SM, on the other hand, provides superior surface finish that is important for functional features such as interfaces between parts in assemblies (e.g., the holes in this bracket). In spite of the precision and surface quality, SM is far more limited in generating complex shapes due to accessibility constraints and would be wasteful to start from a raw stock. HM offers the best of both worlds by combining AM and SM modalities in a single process plan.

Figure 2:
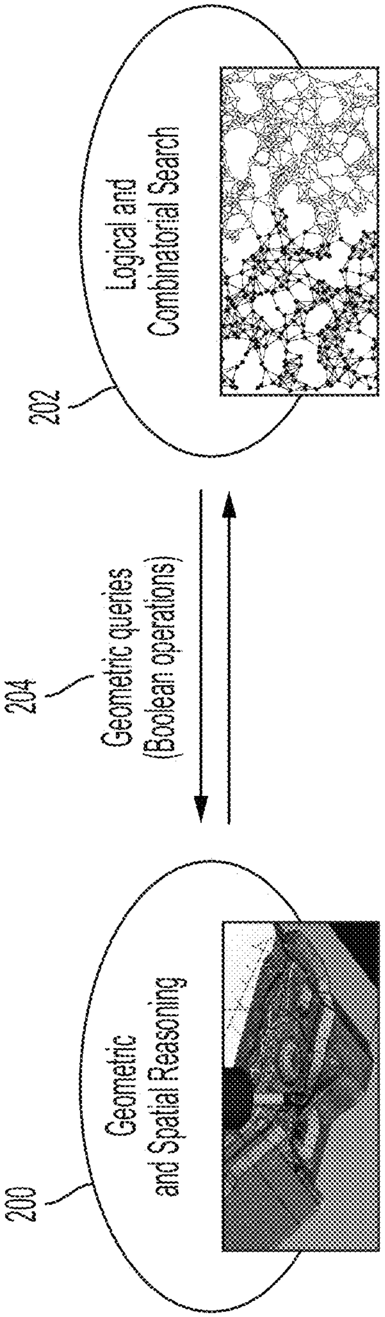
FIG. 2 is a diagram showing separation of concerns between geometric and spatial reasoning based on shape representations and logical combinatorial search based on symbolic representations in hybrid manufacturing according to an example embodiment.

In FIG. 2, a diagram shows separation of concerns by defining logical representations for process planning, achieved via membership queries and Boolean operations. In this method, the geometric modeling and spatial reasoning 200, used to determine the building blocks of individual AM/SM actions (called AM/SM "primitive"), is separated from combinatorial search based on symbolic/logical representation 202, used to find sequences of such actions that produce the desired outcome with minimal or reduced cost. A finite (and reasonably small) number of geometric queries 204 are used to define the logical representations 202 from geometric representations 200, to sufficiently capture Boolean operations among primitives. This approach to process planning is feature-free, meaning that it does not require defining manufacturing "features" of shape or size, which are ad hoc, application-dependent, and limited to simple shapes and clearly separable features (e.g., "holes", "grooves", "pockets", etc.). The AM/SM primitives, on the other hand, can be of arbitrarily complex shapes.

Figure 3:
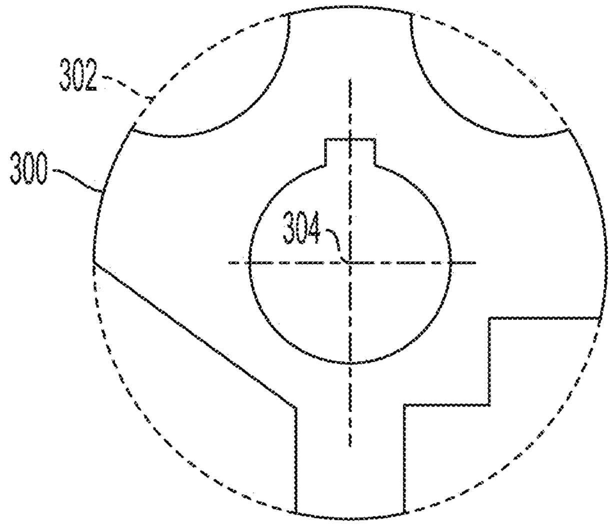
FIGS. 3 and 4 are two-dimensional diagrams showing as-designed parts that may be analyzed using respective subtractive manufacturing and hybrid manufacturing according to example embodiments.

In FIG. 3, a two-dimensional (2D) diagram shows the cross-section of a prismatic three-dimensional (3D) part 300 that may be manufactured from a cylindrical bar stock 302 using a unimodal SM process plan comprising a combination of turning, milling (form milling and grooving), and drilling capabilities. For a given as-designed target shape 300, six independent manufacturing "actions" that utilize these capabilities in any arbitrary order may be described. Each manufacturing action is a mapping that takes the initial state (e.g., a raw/bar stock or an intermediate state of the workpiece) as an input. As an output, the manufacturing action produces a larger shape (AM action's output) or a smaller shape (SM action's output) than the input, modeled by applying a Boolean operation between the input shape and a so-called manufacturing "primitive".

As described in U.S. Pat. No. 10,719,069, an AM/SM primitive can be computed using any number of geometric or physical reasoning approaches. In one embodiment, an AM/SM primitive may be defined as the "closest" possible shape to the as-designed target shape that a given AM/SM capability can produce from an empty platform (AM action) or a raw/bar stock (SM action). The closeness can be defined according to any reasonable, generic or application-specific, metric of shape similarity or criteria for shape interchangeability (e.g., geometric dimensioning and tolerancing specifications). An AM/SM "capability" is defined by the shape and motion degrees of freedom (DOF) of the corresponding AM/SM instrument. In one embodiment, the closeness may be defined in terms of set-theoretic containment and maximal pointsets. For instance, an AM primitive may be defined as the maximal pointset, contained within the as-designed shape, that can be manufactured with the given single AM capability, starting from an empty platform. Similarly, an SM primitive may be defined as the maximal pointset, contained outside the as-designed shape (e.g., within its complement), that can be manufactured with the given single SM capability, starting from a large enough raw/bar stock. For example, in FIG. 3, the disk 302 represents the cross-section of the smallest shape that may be formed by a turning capability, e.g., a turning tool of known shape on a lathe machine of uni-axial rotary DOF that can remove material radially about the center point 304 representing the axis of rotation, resulting in an axisymmetric primitive. In another embodiment, surface overlap measures may be used to define primitives, e.g., an SM primitive for a turning capability may be defined as the axisymmetric shape that has the largest overlap with the as-designed part 300 along the circular arcs that represent the outer cylindrical surfaces. In this example, both criteria lead to the same primitive, but it may not be the case in general. Moreover, although primitive in this embodiment are defined purely in geometric terms, considering the shape of as-designed part, tools, and machine motions, one may extend their definitions to account for physical and material properties represented by spatial fields over geometric shapes. The closeness in this case may be defined in terms of comparison measures among fields (e.g., $L_p$-norms).

Figure 5:
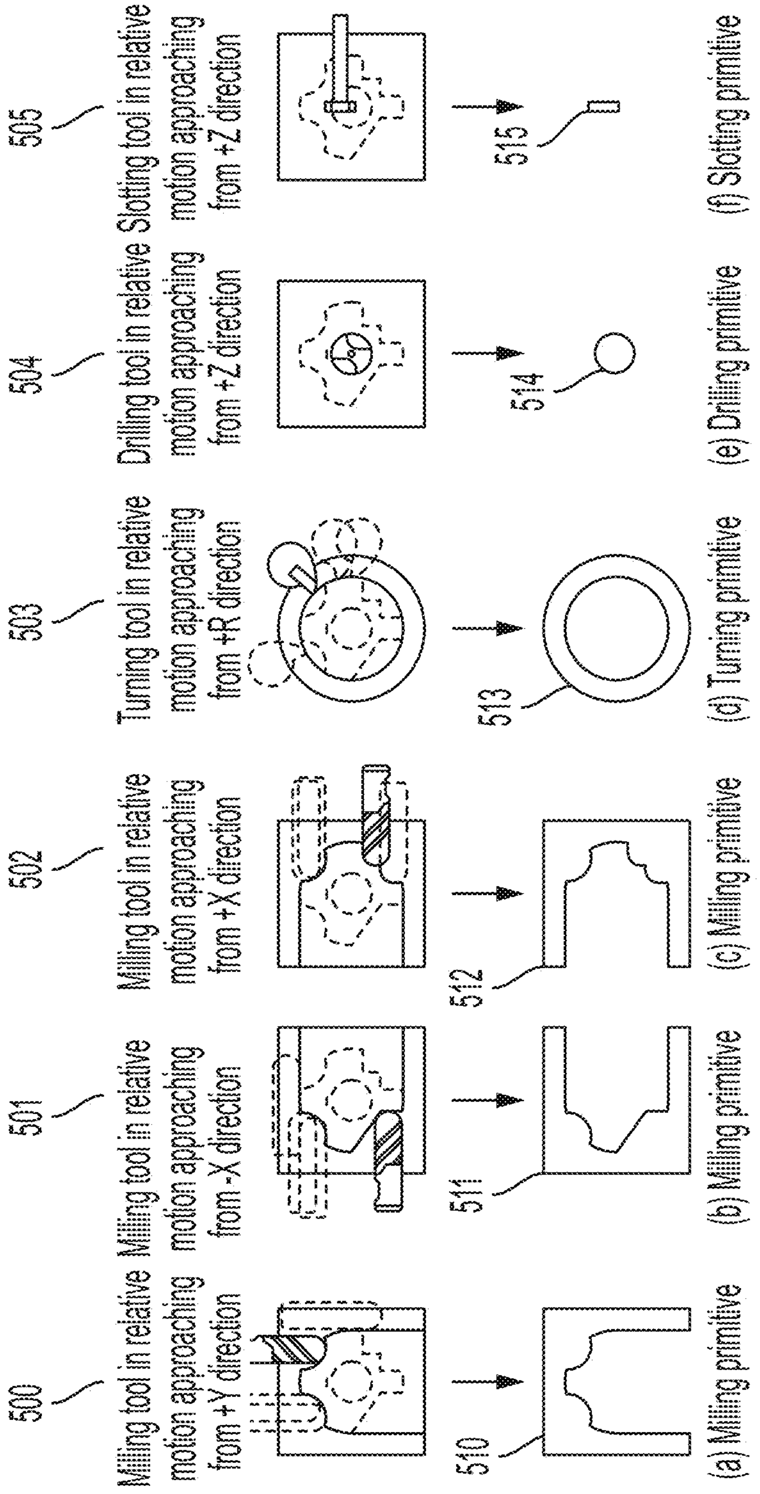
FIG. 5 is a diagram showing independent formation of unimodal (e.g., all-subtractive) manufacturing primitives for the as-designed part shown in FIG. 3.
Figure 6:
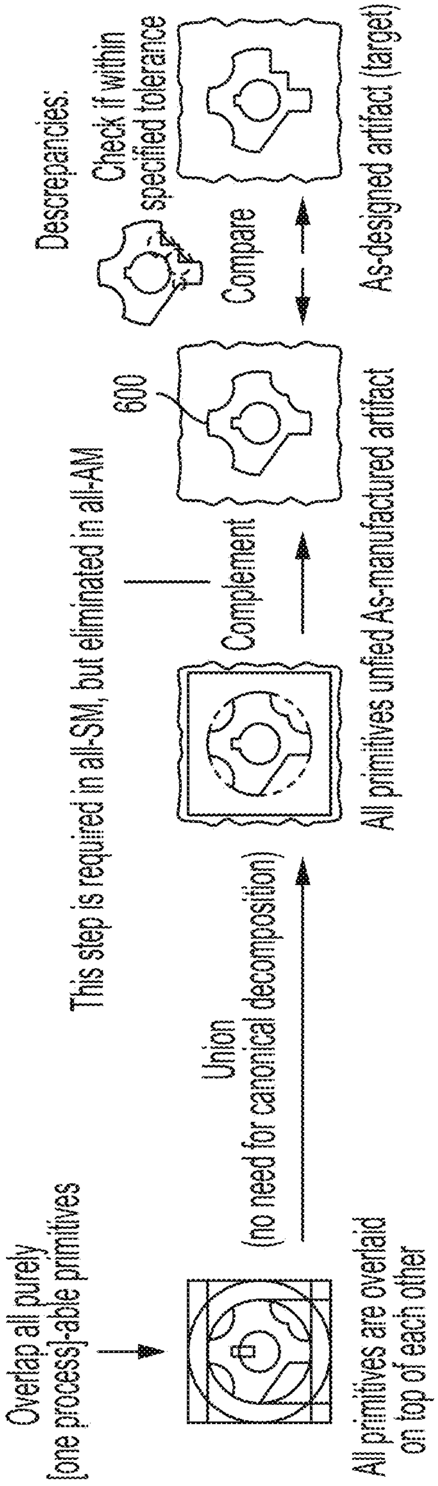
FIG. 6 is a diagram showing how unimodal primitives in FIG. 5 are combined and unified to form an as-manufactured part which can be compared to the as-designed part for early manufacturability test.

An illustration of the formation of manufacturing primitives in one possible embodiment for the part 300 in FIG. 3 is shown in the diagram of FIG. 5. This diagram shows six different SM manufacturing actions 500-505 that can be used to partially form the part 300 using a milling tool, turning tool, drilling tool, and slotting tool. Each manufacturing action 500-505 is a mapping that intersects a given input shape with the complement of one manufacturing primitive 510-515 to obtain an output shape. This step is equivalent to subtracting the primitive from the input shape. In FIG. 6, a diagram shows how these primitives are combined in an arbitrary order to create the resultant as-manufactured part 600, which is interchangeable with the as-designed part 300 in FIG. 3. In one embodiment, this means that the difference between them are acceptable according to some tolerance specification. Notice that the permutativity of unimodal (in this case, SM-only) process plans enables devising a necessary and sufficient condition for manufacturability, thus a "strong" early test before process planning, because the as-manufactured shape does not depend on the order of applying the unimodal actions (in this case, the order of subtracting SM primitives) hence can be evaluated and compared against the as-designed target shape prior to process planning.

In general, an HM process plan involves a finite sequence of arbitrary manufacturing actions, defined by a finite sequence of unions (with AM primitives) and intersections (with complements of SM primitives) leading to a Boolean formula. Since both unions and intersections are commutative and associative among themselves, the order of applying a finite number of them does not matter and the final state will always be the same after executing the same set of unimodal manufacturing actions in any arbitrary order. Thus, the part 300 in FIG. 3 will be manufacturable using any combination of the given set of six SM actions if and only if the unique as-manufactured shape obtained as the intersection of the initial state (e.g., a raw/bar stock) with the complements of the six SM primitives, applied in any order, is interchangeable with the as-designed target shape. A similar reasoning can be shown for unimodal AM-only process plans, in which the as-manufactured shape is computed as the union of the initial state (e.g., empty set) with any number of AM primitives, applied in any order.

For both AM-only and SM-only process plans, the manufacturability analysis can be decoupled from process planning as long as the primitives can be defined and computed a priori regardless of the order of their appearance in the process plan. The key enabling property is that the outcome of any unimodal formula, that is, a formula that has either all union operations or all intersection operations, but not both in the same formula, is invariant under permutations of actions. The insensitivity of the outcome of unimodal manufacturing processes to the order of execution, whether AM-only or SM-only, has an advantageous implication. The manufacturability test reduces to the evaluation of the as-manufactured artifact from an unordered Boolean formula followed by a rapid test of the interchangeability of the as-manufactured shape, for instance, in terms of tolerance specifications, against the as-designed target shape. The manufacturability test is decisive regardless of the order of execution, thus becomes conveniently decoupled from process planning. However, the manufacturing cost still depends upon the sequence, and drives the process planning if more than one feasible process plan can be obtained.

The monotonicity of the unimodal process plans, meaning that the state transitions are either adding to (AM-only) or removing from (SM-only) the changing state of the artifact throughout unimodal sequences, offers a further significant advantage when looking for sensible heuristics to automatically generate manufacturing primitives. As described in U.S. Pat. No. 10,719,069, for a unimodal AM-only process plan, the AM primitives can be defined as the maximal depositable volume, e.g., the set-theoretically closest possible pointset to the as-designed target shape, achievable in a single step using the AM capability of interest. Likewise, for a unimodal SM-only process plan, the SM primitives can be defined as the maximal removable volume, e.g., the set-theoretically closest possible pointset to the complement of as-designed target shape, achievable in a single step using the SM capability of interest. This "greedy" heuristic makes sense only in monotonic sequences, in which one desires to close the remaining gap between the intermediate state and target shape as much as possible in a single move. However, the manufacturing primitives need not always be selected as these maximal sets, given that a maximal volume heuristic per action may not always represent a globally optimal choice.

Multimodal HM process plans with alternating AM/SM modalities in arbitrary orders lack the commutativity and monotonicity properties of unimodal AM-only or SM-only process plans. The order of execution of constituent AM/SM actions matter because union and intersection operations, despite being commutative among themselves, are not commutative with each other. As a result, decoupling manufacturability analysis from manufacturing planning is difficult. Furthermore, the intermediate manufacturing states do not consistently approach the final state of the as-manufactured part by increasing or decreasing in physical size. Rather, the inchoate part might vacillate in size around the target shape multiple times before converging, such as where materials are added and removed in alternating AM/SM cycles.

Figure 4:
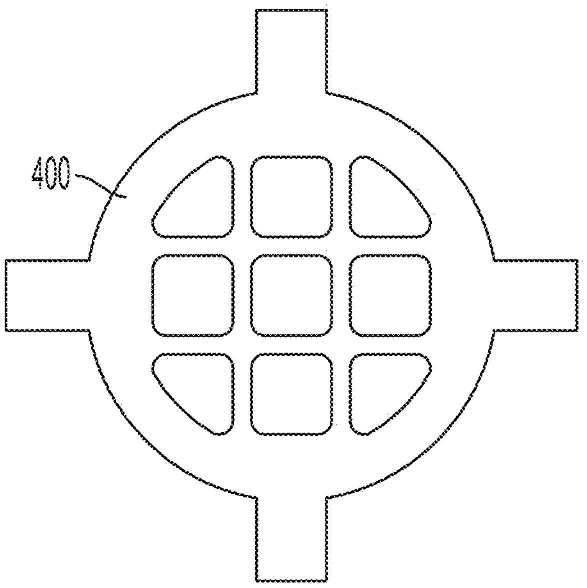

In FIG. 4, a two-dimensional (2D) diagram shows the cross-section of a prismatic three-dimensional (3D) part 400 that can be manufactured using hybrid multimodal AM/SM processes; for instance, multi-task computer numerical control (CNC) machines that offer a combination of turning, milling, and 3D printing capabilities. The formation of primitives 710-715 for various AM/SM capabilities 700-705, respectively, for the part 400 in FIG. 4 is shown for one possible embodiment in the diagram of FIG. 7. The first two 710 and 711 are AM primitives, produced by two different (axial and radial) 3D printing capabilities 700 and 701, whereas the remaining four are SM primitives, two of which 712 and 713 are produced by the same turning capability 702 and 703, and the other two 714 and 715 are produced by two different milling capabilities 704 and 705. Once again, each AM/SM primitive is defined and computed independently as the "closest" possible shape one could obtain, should one had access only to one of the respective AM/SM capabilities in isolation. In the absence of monotonicity, "greedy" criteria based on set-theoretic maximality are not necessarily the best heuristic for defining the primitives, thus other criteria, e.g., based on surface overlap, maximizing accessibility, minimizing support structure, and so on can be used to define the closeness.

The approach described herein alleviates the analytical deadlock in hybrid multimodal AM/SM processes that can be caused by the lack of the commutativity and monotonicity properties of unimodal AM-only or SM-only processes where the sequence of AM/SM actions necessary to obtain an as-manufactured artifact are order dependent. Nonetheless, every finite Boolean formula, which includes a finite number of union and intersection operations applied to a finite number of geometric pointsets (e.g., 3D objects), can be expressed in the so-called disjunctive normal form (DNF).

The DNF form is composed of a finite number of disjunctions (e.g., set unions) of a number of Boolean clauses, each of which is finite number of conjunctions (e.g., set intersections) of the primitives or their complements. Each clause evaluates to a so-called canonical intersection term (e.g., manufacturing "atoms"). The atoms are pairwise mutually disjoint, that is, do not collide with each other's 3D interiors, and partition the three-dimensional space into the smallest regions that can be produced by all Boolean formulae on the same primitives and their complements. In other words, every outcome of every Boolean formula is the union of a sub-collection of these atoms. Intuitively, this means that for a given set of manufacturing primitives, the corresponding atomic decomposition represents a discretization of the 3D space that can represent every possible manufacturable shape.

An atom is the smallest manufacturable unit, e.g., cannot be split into smaller pieces by the given set of primitives. However, an atom cannot come in or out of existence by itself; rather, every primitive can be viewed as a collection of atoms that have to be brought into existence (AM action) or out of existence (SM actions) together. Every atom can be viewed as the equivalence class of points in 3D that are either completely inside or completely outside every given primitives, which is why an atom cannot be split into smaller pieces by any action that can be described by a Boolean operation with any of the primitives. Whether a particular atom ends up inside or outside the resultant of a given Boolean formula (representing an HM process plan) depends upon the union and intersect operations and their orders of execution.

Although the particular Boolean function that leads to the as-manufactured artifact is not known a priori, an important necessary (but not sufficient) condition for manufacturability is known; namely, that the as-designed target shape should conform to the same atomic decomposition if the target shape is to be produced within the same Boolean algebra. In other words, the as-manufactured part should be decomposable into a sub-collection of the atoms, without splitting any one atom into smaller pieces. Thus, for a given collection of primitives, atomic decomposition can be rapidly computed, and, at almost no extra computation cost, whether a sub-collection of the atoms exists, whose union is the same as (or interchangeable with) the as-designed target shape, can also be determined. If such a union is found, that sub-collection immediately yields a symbolic DNF for the as-manufactured target shape, which expresses the target shape as a disjunction (e.g., set union) of the sub-collection of atoms, each of which is a conjunction (e.g., intersection) of a subset of primitives and their complements.

Figure 7:
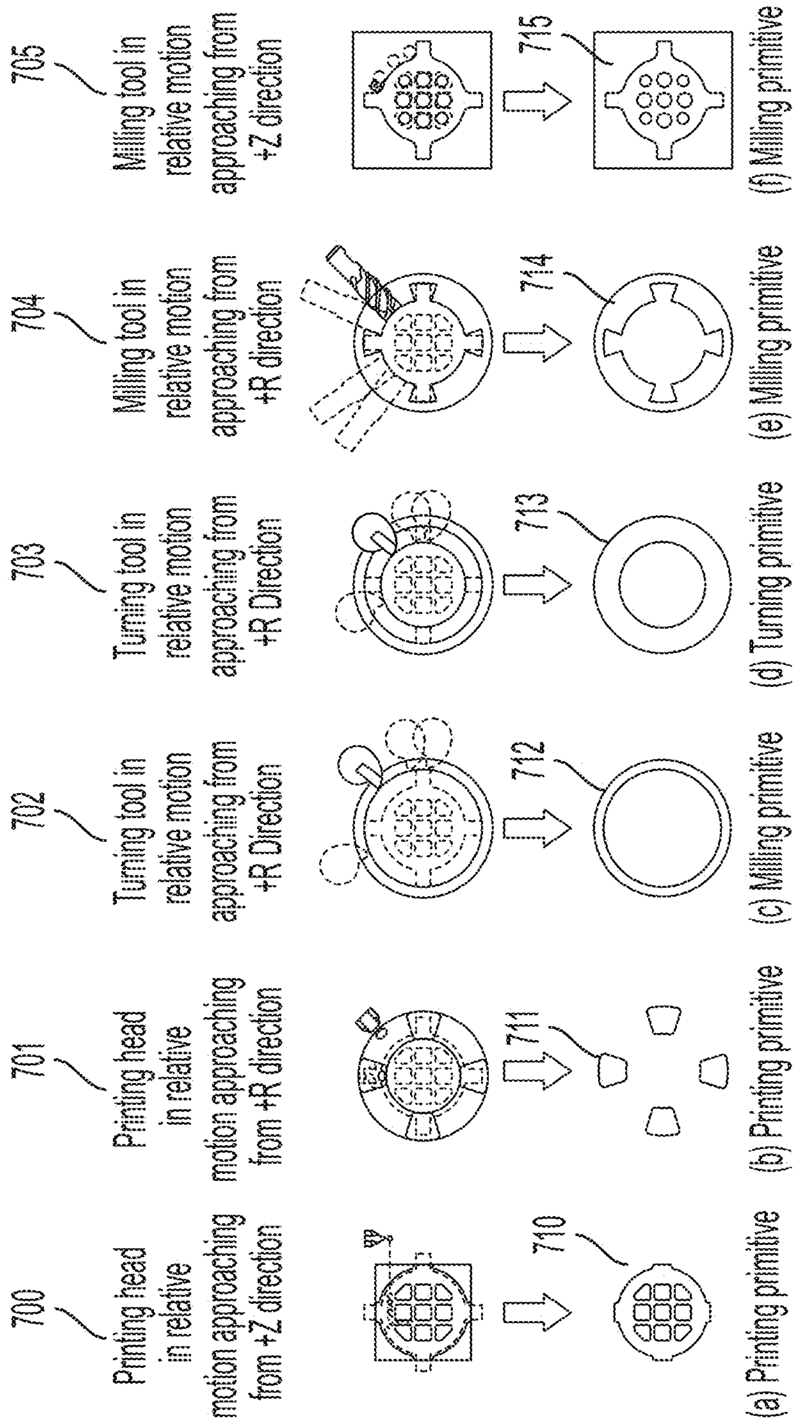
FIG. 7 is a diagram showing independent formation of multi-modal (including both additive and subtractive) manufacturing primitives for the as-designed part shown in FIG. 4.
Figure 8:
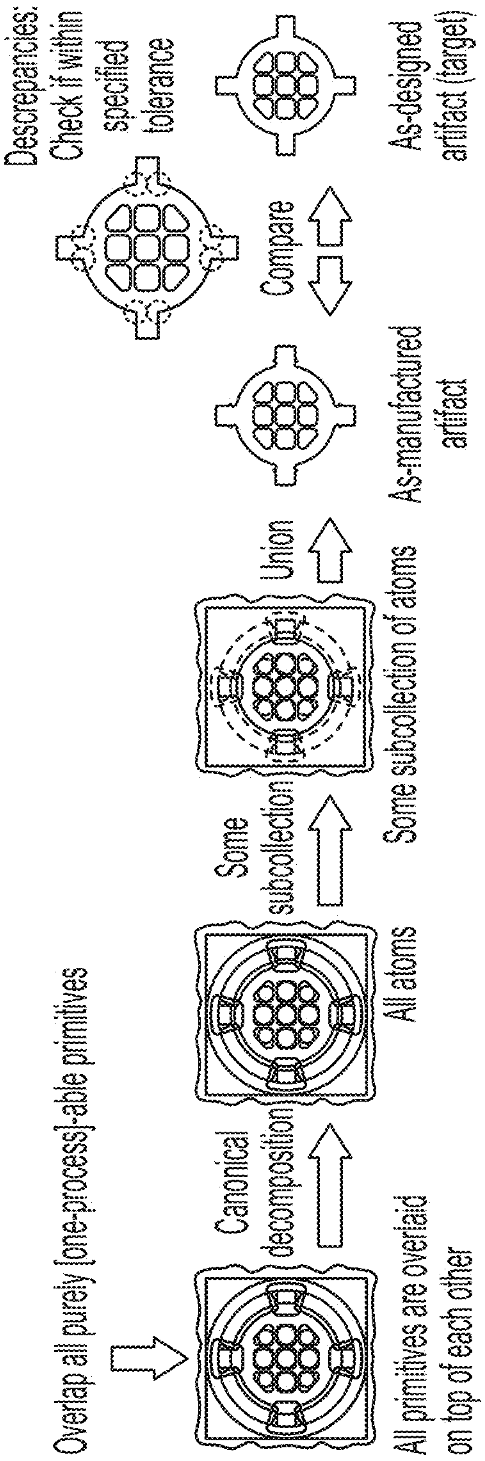
FIG. 8 is a diagram showing how multimodal primitives in FIG. 7 are combined to form a canonical (e.g., atomic) decomposition into manufacturing atoms, sub-collections of which can form as-manufactured parts that can be compared to the as-designed part for early manufacturability test.

In FIG. 8, a diagram shows how the six primitives 710-715 in FIG. 7, including two AM primitives 710 and 711 and four SM primitives 712-715, are overlaid on top of each other so that the atoms become visually separable. The canonical (e.g., atomic) decomposition produces a number of atoms that appear as the disjoint regions separated by the boundaries of the primitives. A union of some sub-collection of these atoms turns out to be interchangeable with the as-designed target shape. In one embodiment, this means that the difference between them are acceptable according to some tolerance specification. Although this is necessary for the existence of at least one Boolean formula in terms of primitives that produces the as-designed target shape, it is not sufficient for such formula to be a "valid" HM process plan. Hence, this condition enables a "weak" early test for manufacturability, or equivalently, a definitive early test for non-manufacturability, prior to process planning (which could be computationally a lot costlier for HM).

Once the primitives are computed using geometric and spatial reasoning algorithms (e.g., based on accessibility, support structure, and minimum feature size) and the atomic decomposition is computed using standard geometric algorithms for Boolean intersections among primitives and their complements, the remaining steps are entirely based on symbolic/logical representations and combinatorial algorithms. In the remaining part of this document and the accompanying illustrations in FIGS. 9, 10, 11, 12, 13, 14, 15, 19, 25, and 28, we explain a method for deriving a "strong" test (based on a necessary and sufficient condition) for manufacturability and process planning for combined AM and SM primitives, using simple illustrative shapes (e.g., boxes) for manufacturing primitives that partake in Boolean operations that model manufacturing actions. The diagrams are interpreted as abstract visualizations of logical Venn diagrams in which the actual shape (geometry and topology) of primitives, atoms, initial state (e.g., raw/bar stock), intermediate states (e.g., workpiece), final state (e.g., as-manufactured part), and target state (e.g., as-designed part) is not relevant. The method is shape-agnostic, e.g., applies to arbitrary shapes for these pointsets, represented and stored in a computer system using arbitrary representation schemes and algorithms for generating primitives and atoms.

Figure 9:
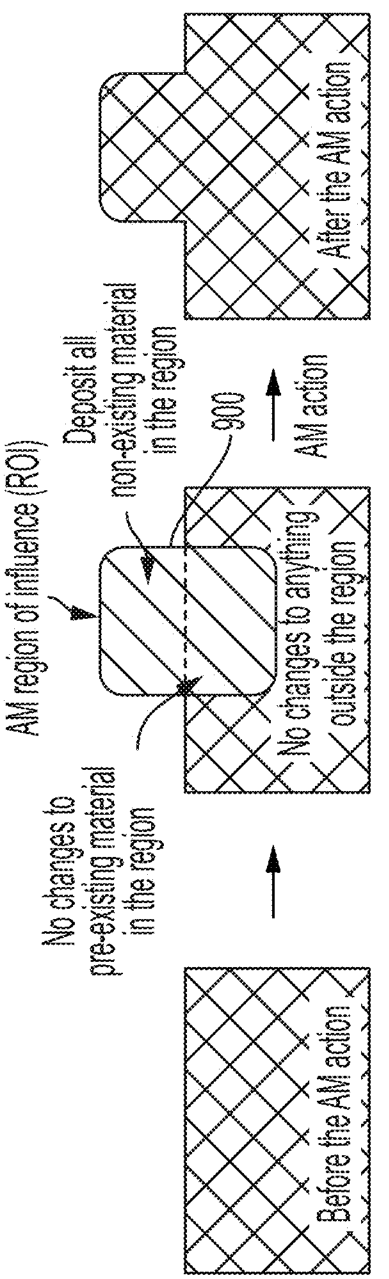
FIGS. 9 and 10 are diagrams showing how additive and subtractive manufacturing actions are modeled by set union and intersection operations with manufacturing primitives that form the building blocks of a manufacturing process plan.
Figure 10:
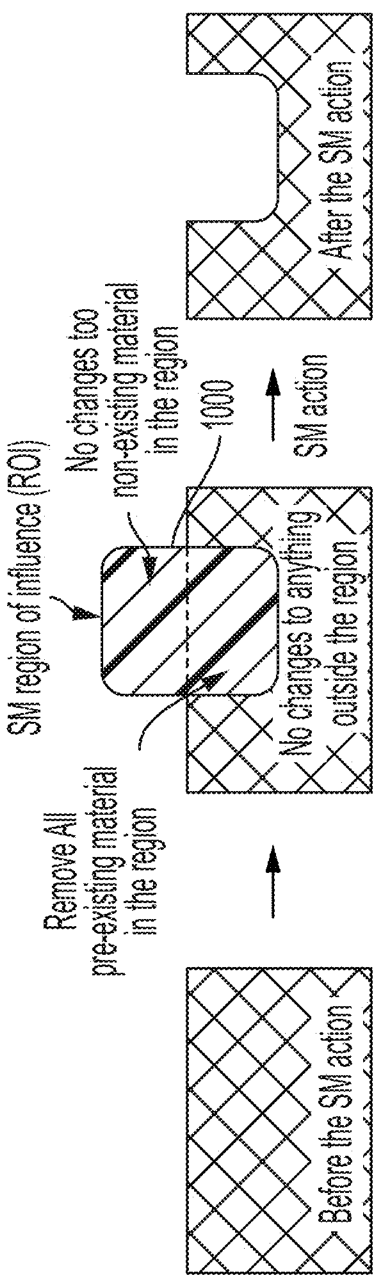

In FIGS. 9 and 10, diagrams show a basic model of AM and SM actions, respectively, defined in one embodiment as Boolean operations involving the regions of influence (ROI) for each action, leading to AM and SM primitives, respectively. In one embodiment, an AM action 900, on the one hand, is defined as a Boolean union of the current state with an AM primitive. An SM action 1000, on the other hand, is defined as a Boolean intersection of the current state with the complement of an SM primitive, e.g., the Boolean difference of the SM primitive from the current state. Note that the pre-existence or lack of material in a portion of the ROI does not affect the actions, e.g., the ROI may be partially full/empty. For instance, an AM primitive may intersect the intermediate state, in which case the intersection region would not be affected. In a physical process, this means that the AM instrument (e.g., 3D printer head) would skip this region and simply deposit only the remaining part of the AM primitive that does not intersect the current state. Similarly, an SM primitive may intersect the complement of the intermediate state, in which case the intersection region would not be affected. In a physical process, this means that the SM instrument (e.g., milling machine) would skip this region and simply remove only the remaining part of the AM primitive that intersects the current state. Such decisions are postpone to the path-planning stage.

Figure 11:
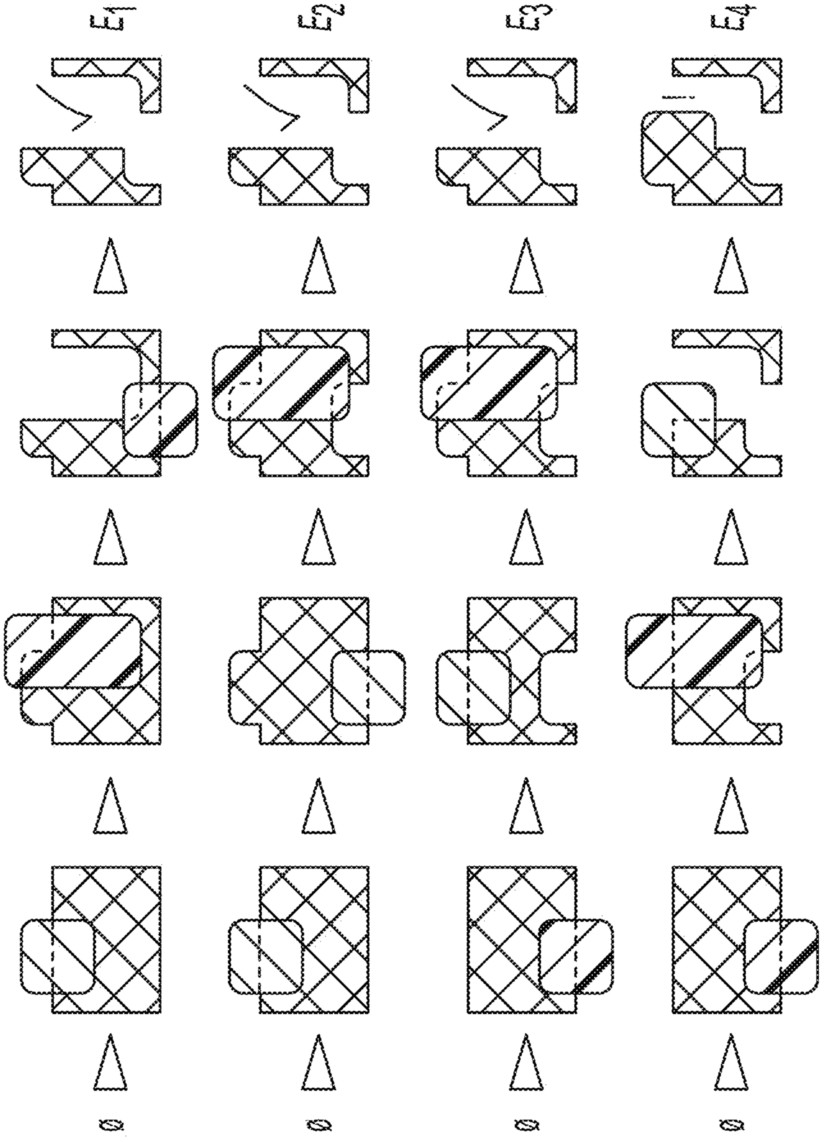
FIG. 11 is a diagram showing how changing the order of application of primitives in a multimodal manufacturing process plan may or may not change the outcome (e.g., as-manufactured part) depending on the modalities.

In FIG. 11, a simplified diagram shows four different sequences $E_1$-$E_4$ of the same AM/SM primitives applied in different orders. Note that the same shading for AM action 900 and SM action 1000 in FIGS. 9 and 10, respectively, are applied to AM and SM primitives in FIG. 11. As seen by the final as-manufactured shape in the right-most column, the last sequence $E_4$ does not result in the desired shape, while the other sequences $E_1$-$E_3$ do result in the desired shape. This example shows that in unimodal HM process plans involving both AM and SM actions, changing the order of actions may change the outcome; however, there are certain types of re-ordering that does not affect the final (e.g., as-manufactured) state. For example, swapping an AM action and an SM action whose primitives do not intersect (e.g., $E_1$ vs. $E_2$) would not change the outcome. As another example, swapping an AM action with an AM action (e.g., $E_2$ vs. $E_3$) or an SM action with an SM action, even if their primitives intersect, would not change the outcome. In fact, every unimodal subsequence of the multimodal sequence can be shuffled without changing the outcome, because Boolean unions and intersections are commutative and distributive among themselves. However, the cost may change in all cases.

Figure 12:
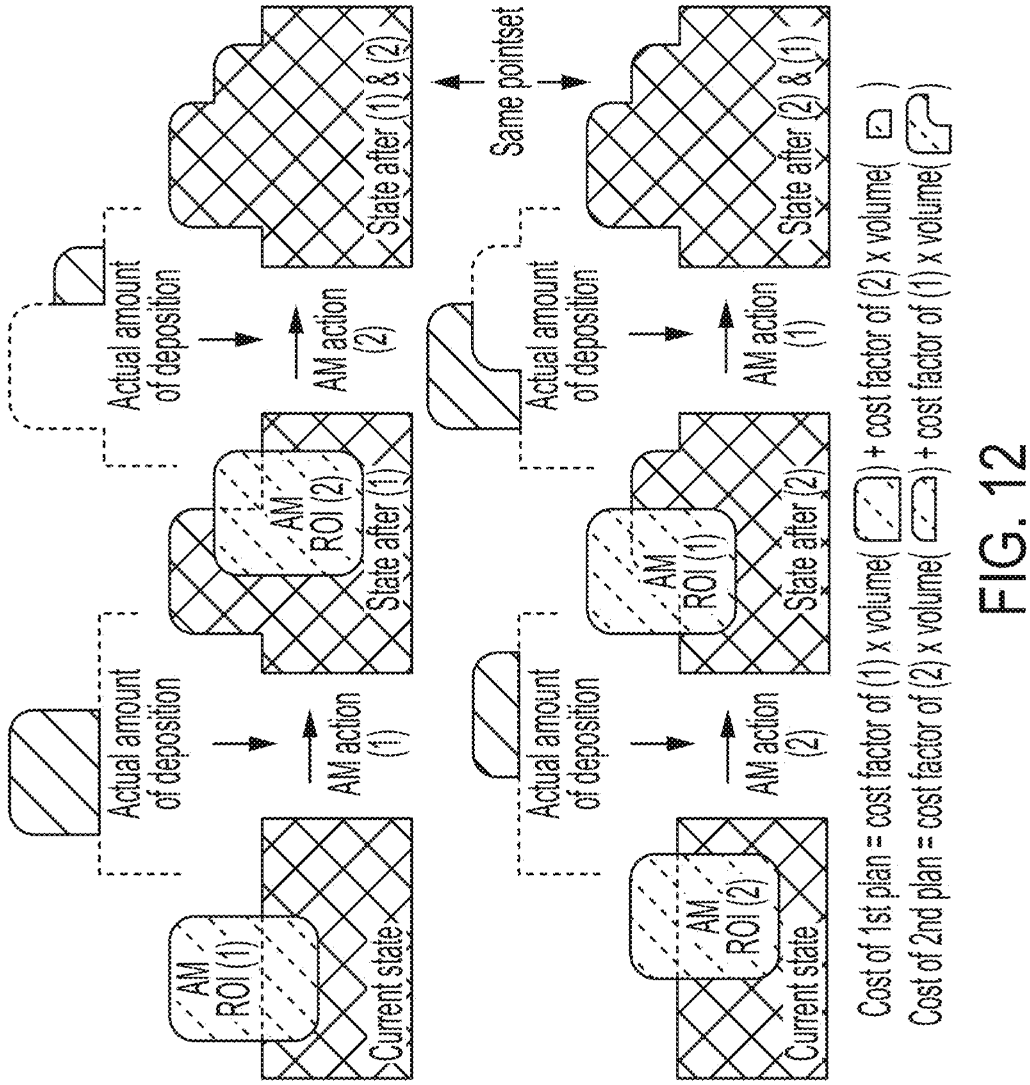
FIGS. 12 and 13 are diagrams showing cost calculation for additive and subtractive manufacturing actions based on the volume of actual material deposited or removed in a manufacturing process plan according to an example embodiment.
Figure 13:
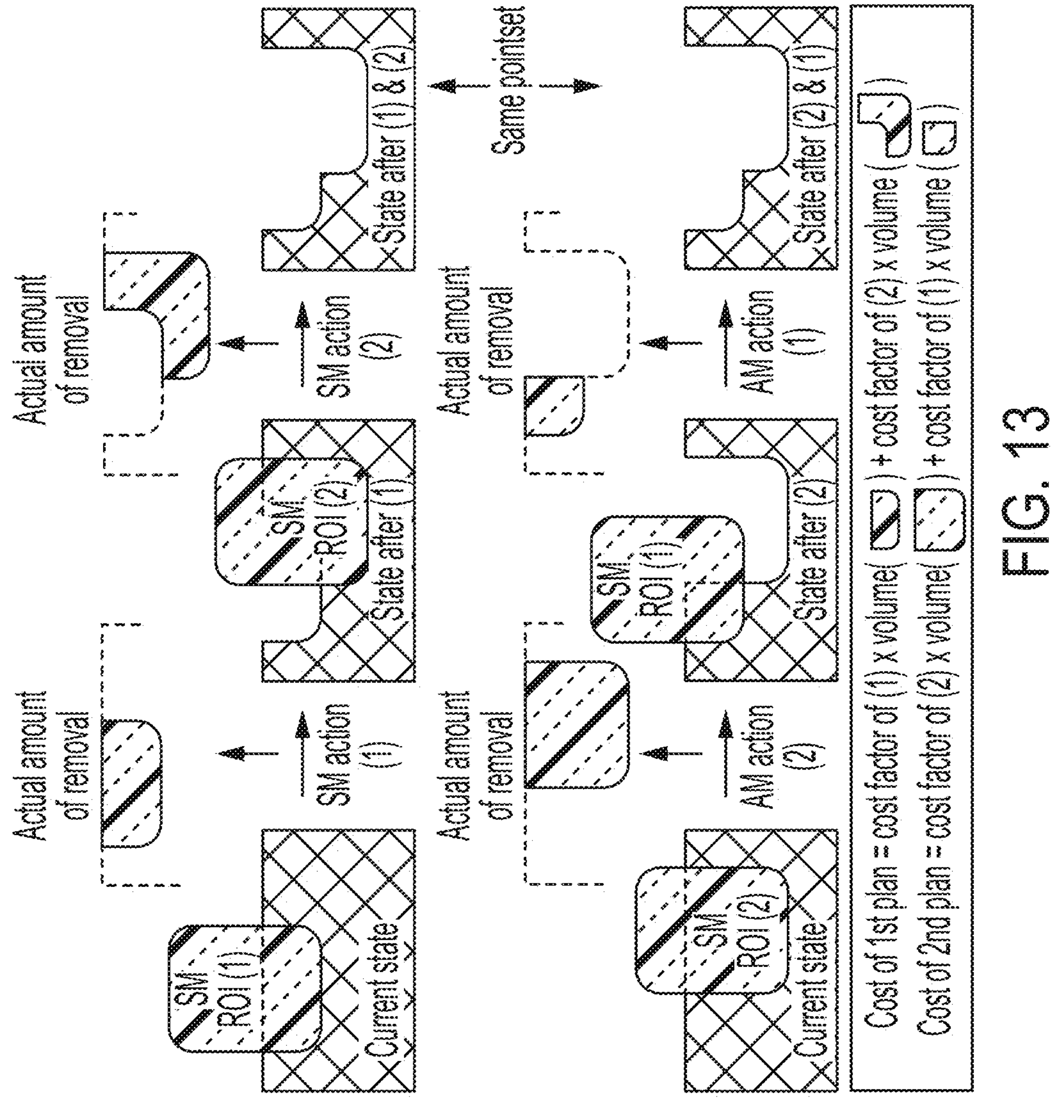

In FIGS. 12 and 13, diagrams show cost calculation for AM and SM actions, respectively, according to an example embodiment, and how the cost may change due to re-ordering of actions of the same type (e.g., swapping two AM actions in FIG. 12 or two SM actions in FIG. 13) within a unimodal subsequence can change the overall cost. In a simple cost model for one embodiment, each ROI may have a different user-defined cost factor, and the actual cost for the action includes the cost factor times the actual deposited volume (for AM actions) or the actual removed volume (for SM actions). The total cost of an HM process plan may be computed as a sum of costs for individual AM and SM actions. The actual deposited/removed volumes may include fractional volumes that are illustrated in the lower part of FIGS. 12 and 13.

Figure 14:
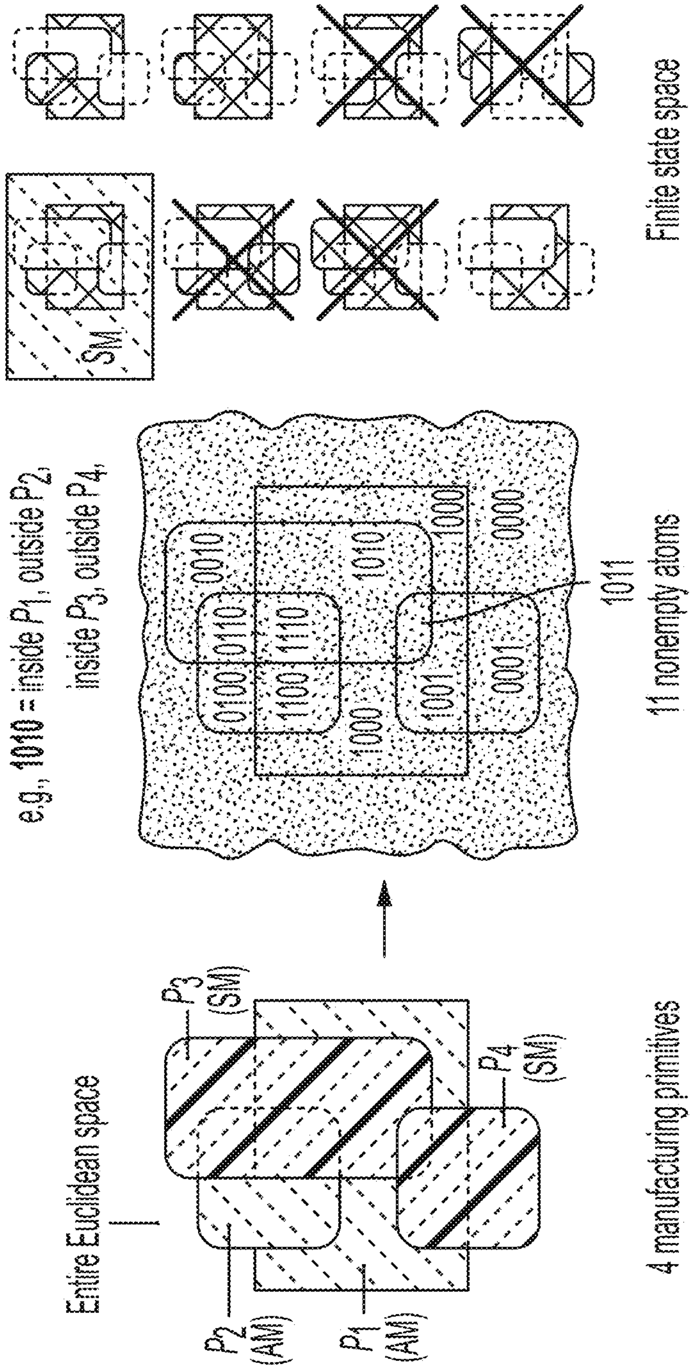
FIG. 14 is a diagram showing how four overlapping manufacturing primitives are decomposed into eleven disjoint atoms and how certain sub-collections of atoms are manufacturable by applying the additive and subtractive primitives in different orders according to an example embodiment.

In FIG. 14, a Venn diagram shows how manufacturing primitives and their complements are intersected to decompose the embedding space into atoms according to an example embodiment. In this example, the four manufacturing primitives and the final as-manufactured state shown in FIG. 11 are used here to illustrate how these four primitives $P_1$-$P_4$ (two AM primitives $P_1$ and $P_2$ and two SM primitives $P_3$ and $P_4$) are used to form eleven nonempty atoms. Each atom is defined by the set of all points that are classified the same way (inside or outside) against all primitives. Every atom is thus encoded by a binary string (e.g., an array of 0 or 1 bits) where a bit at the i-th position in the array indicates whether that atom is wholly inside the i-th primitive (bit=1) or wholly outside the i-th primitive (e.g., wholly inside the i-th primitive's complement). For example, the string 1010 encodes an atom that is made of all point that are inside $P_1$, outside $P_2$, inside $P_3$, and outside $P_4$. In one embodiment, the leading bits are used for AM primitives and the trailing bits are used for SM primitives, although in general an arbitrary pre-defined ordering can be used as long the location used for each primitives is recorded and used consistently.

A necessary but not sufficient condition for manufacturability is that the final as-manufactured state will be a union of a sub-collection of non-empty atoms, thus can be represented by a DNF, e.g., a disjunction of atoms, where each atom is a conjunction or primitives or their complements. FIG. 14 also shows that some sub-collections of these eleven atoms may be produced by a valid process plan, while others may not. A "valid" process plan is defined by a Boolean formula that uses all primitives correctly, e.g., AM primitives are used with a union operator whereas SM primitives are used with a difference operator, e.g., an intersection operator pre-composed with a complement operator. Hence, HM process planning reduces to mapping the DNF to a valid process plan, which is a purely logical problem (called Boolean function learning) and can be solved by symbolic manipulation of Boolean formulae and combinatorial search.

Figure 15:
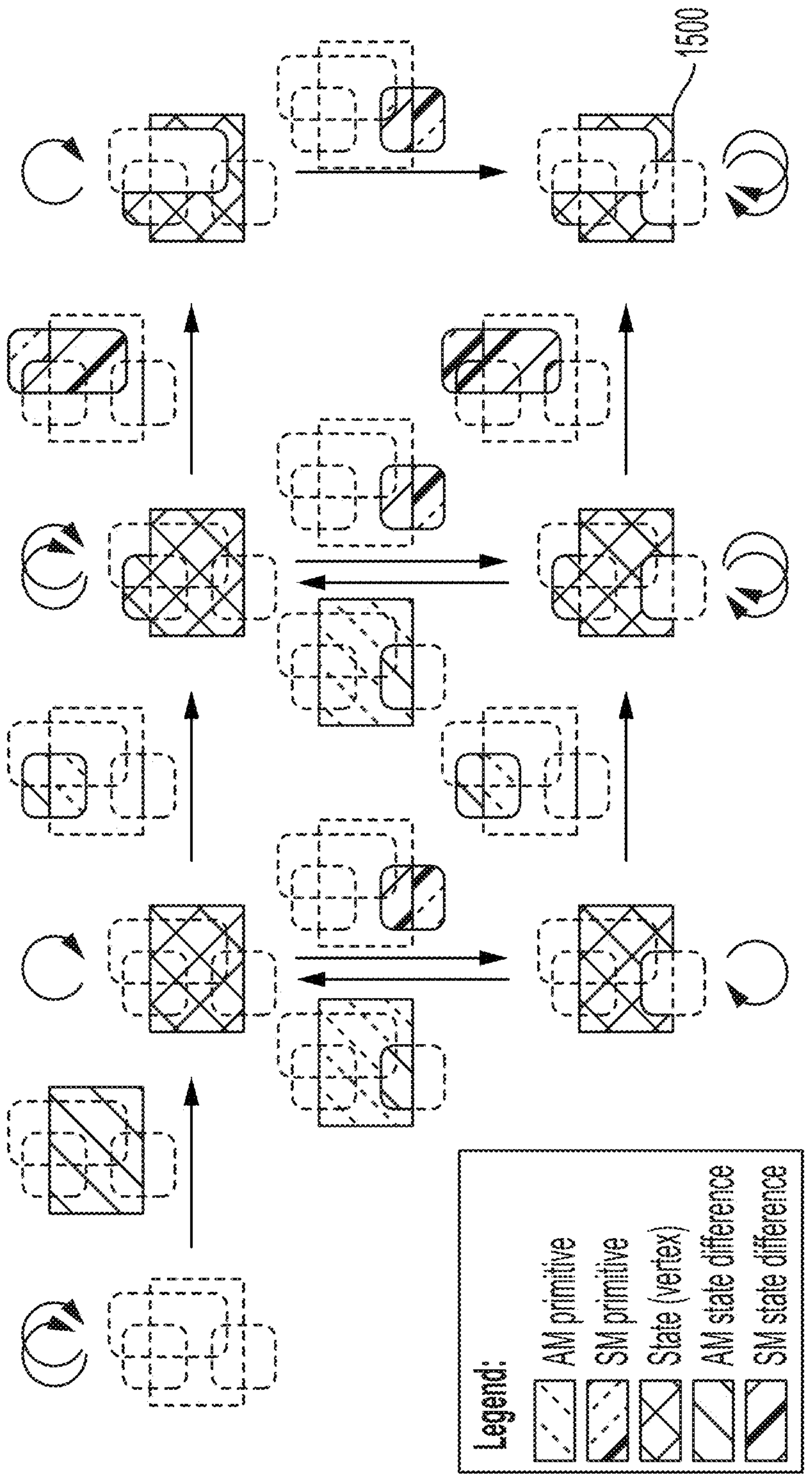
FIGS. 15 and 16 are state diagrams representing manufacturing primitives and atoms of FIG. 14 and the evolving state of a part in both graphical and local encoding and for 3 different manufacturing process plans.
Figure 16:
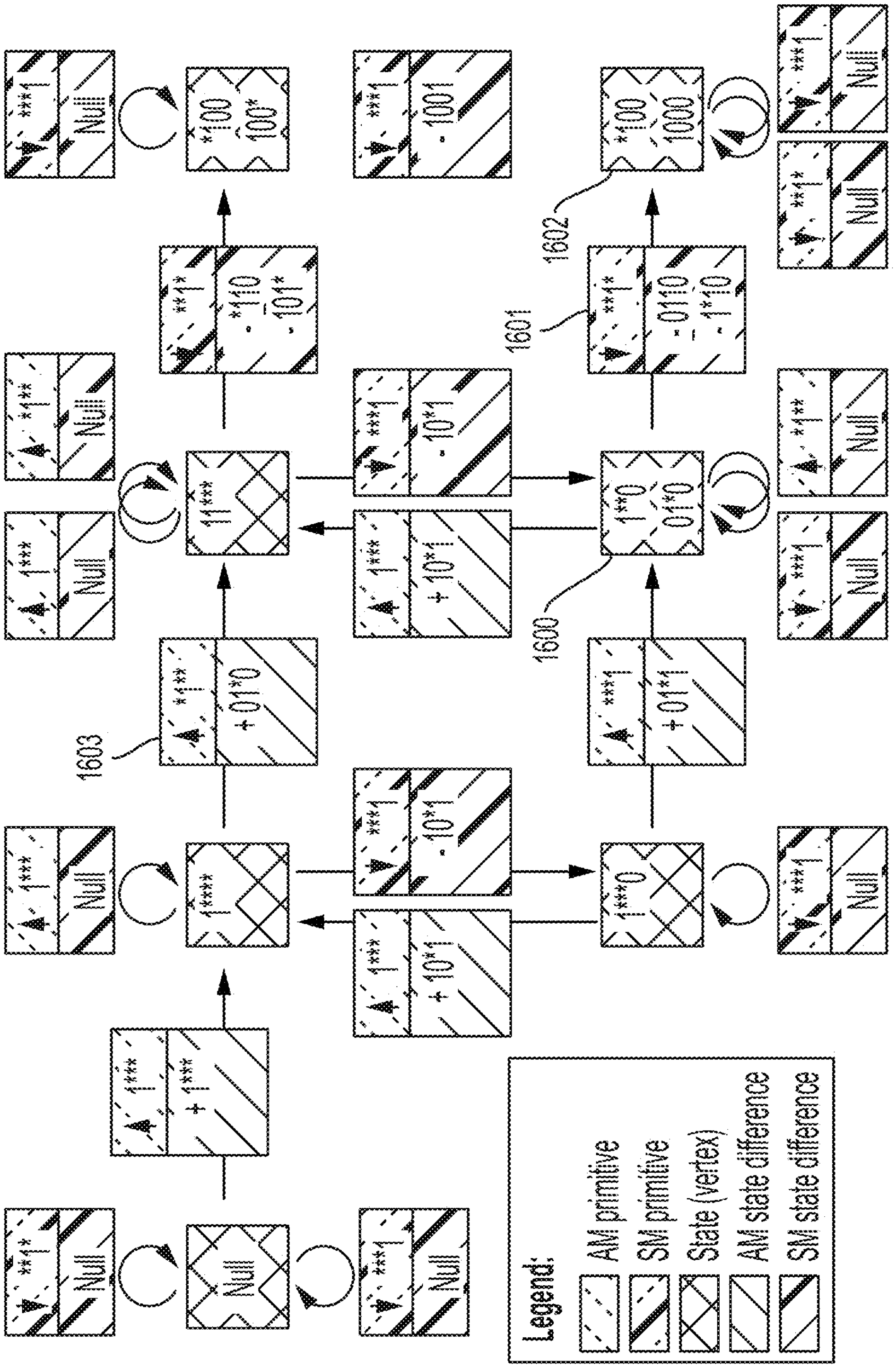

In FIG. 15, a state diagram shows how the previously illustrated manufacturing primitives may be applied in several different process plans, illustrated by different paths (following the arrows) in the diagram. The final state 1500 can be reached using different paths, and some paths between states are shown as two-way, where an AM action is undone by an SM action or vice versa. In FIG. 16, the state diagram of FIG. 15 is shown with the bit indicators for the atoms shown in FIG. 14 used to indicate the states and state changes on the arrows. The upper part of each state change block indicates the manufacturing primitive, and the lower part of each state change block indicates the atoms affected by the state change. For compactness, groups of atoms that share some bits (e.g., are classified similarly among a subset of primitives) are represented by using an asterisk character for their differences.

For example, 01*1 is a compact representation for the union of 0101 and 0111, e.g., the two atoms that are outside $P_1$, inside $P_2$, and inside $P_4$, and the asterisk indicates that classification against $P_3$ can be anything, e.g., we unify the two atoms one of which outside $P_3$ and the other is inside $P_3$. Similarly, 1**0 represents the union of four atoms that are inside $P_1$ and outside $P_4$, but can be either inside or outside $P_2$ and $P_3$.

The i-th primitives and their complements can thus be represented by a binary string with all bits being asterisks except the i-th bit being 1 and 0, respectively. For example, $P_3$ is represented by **1*. The state block 1600 indicates the union of six atoms, two of which are represented by 01*1 and the other four are represented by 10. The arrow 1601 indicates a state change due to the SM primitive $P_3$ (1*), which causes removal of all atoms whose 3rd bit is 1 (and other bits can be anything). Of the five nonempty atoms inside $P_3$, only three of them (namely, 0110, 1010, and 1110)

are present in the state 1600, thus the same three are removed via state change 1601. The result is the union of three atoms (namely, 0100, 1000, and 1100) shown in the state block 1602.

The compact encoding is not unique, e.g., the three atoms that are being removed via state change 1601 may be encoded as {0110, 1*10} or {1010, *110}, both of which mean {0110, 1010, 1110}, only one of which is shown in FIG. 16. Similarly, the resulting three atoms in state block 1602 may be encoded as {*100, 1000} or {0100, 1*00}, both of which mean {0100, 1000, 1100}, only one of which is shown in FIG. 16. Moreover, empty atoms may help disambiguate some of the digits, for instance, the state change 1603 due to the addition of P2 (*1**) may be represented by either 01*0={0100, 0110} or 01**={0100, 0110, 0101, 0111}, noting that their difference 01*1={0101, 0111} are empty atoms because P2 and P4 do not intersect. However, 01 is more general and can be directly inferred from the preceding state's encoding 1* and addition of *1**, because the first digit is already 1 so does not change, the second digit changes from * to 1, and the next two digits  remain unchanged. The logical encoding in FIG. 16 is visualized by the Venn diagrams in FIG. 15**.

Figure 17:
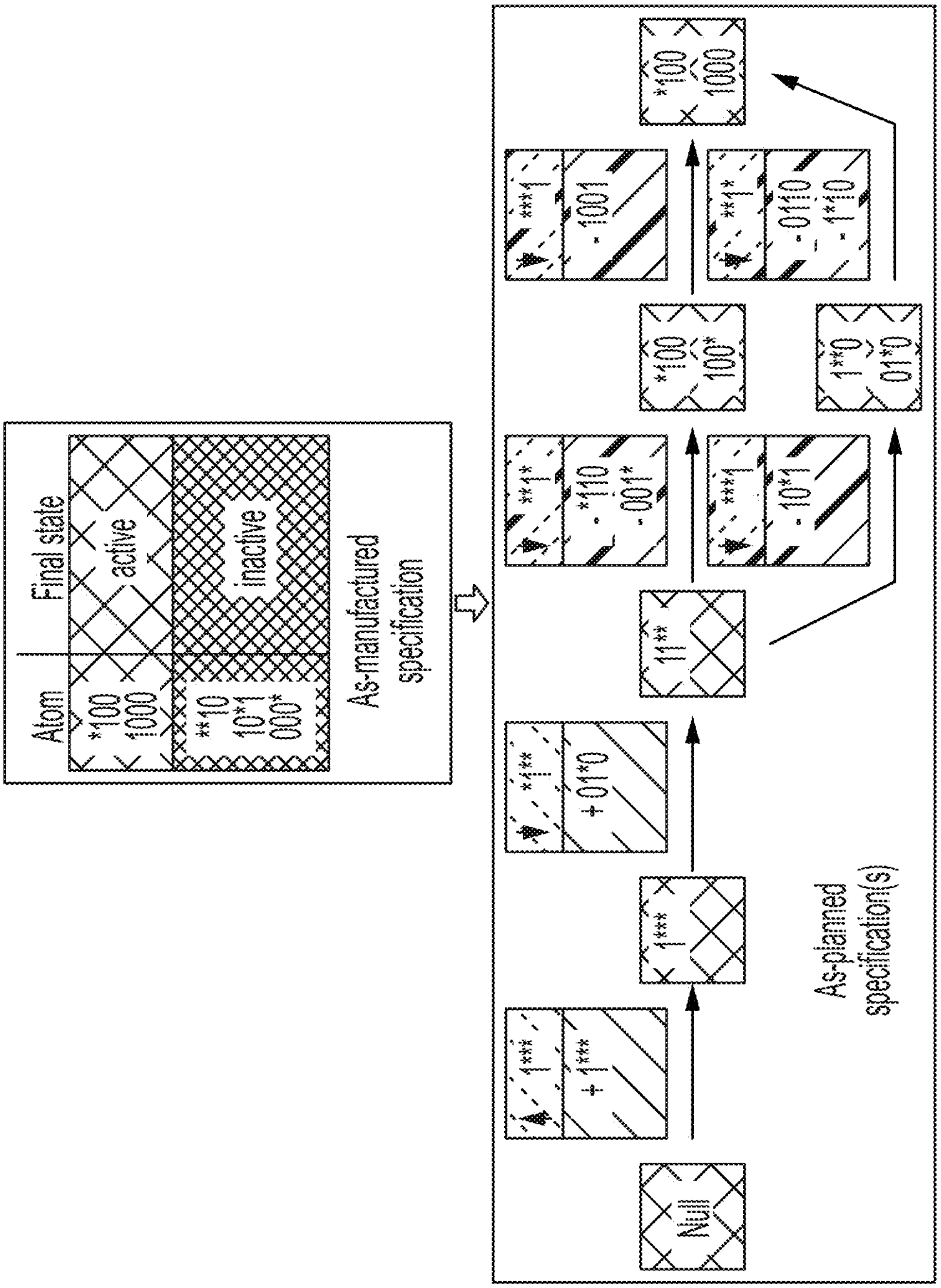
FIG. 17 is a diagram showing a logical encoding of a manufacturing process plan in which each atom is represented compactly by a binary string in which 0 and 1 represent exclusion and inclusion in a primitive and a sub-collection of atoms is represented by one or more binary string with a star character representing a disjunction of 0 and 1.

In FIG. 17, a diagram shows how the as-manufacture state can be specified in terms of the aforementioned binary encodings. For example, the final state in FIG. 15 may be encoded by either "active" or "inactive" atoms, e.g., atoms that should end up inside or outside the final state after going through a feasible plan, respectively. A valid plan is "feasible" if it generates the desired as-manufactured state, specified by the binary strings. FIG. 17 also shows two feasible plans that generate the aforementioned final state, although they might have different costs. An "optimal" plan is a feasible plan that has the lowest cost among all feasible plans.

In FIG. 18, an alternative symbolic representation of the as-manufactured shape $S_M$ in FIGS. 15-17 is shown as a union of three atoms $A_{0100}$, $A_{1000}$, and $A_{1100}$, where the binary strings that encode each atom (e.g., a symbolic set here) are used as subscripts. Each atom is the intersection of four sets, each set being either a primitive $P_i$ or the complement of a primitive $\overline{P}_i$ for i=1, 2, 3, 4. Substituting the conjunctive expressions for atoms into the disjunctive expression for $S_M$ yields a DNF representation for $S_M$. FIG. 18 also shows the Boolean formulae for three feasible plans that produce $S_M$. The classification of atoms against the primitives $P_1$-$P_4$, as-manufactured target $S_M$, and the outcome of each of the three feasible plans $E_1$-$E_3$ can be depicted by a "truth table" in which 1 means inside and 0 means outside. Note that 4 primitives may produce $2^4$=16 atoms, many of which will be empty because some primitives or their complements do not intersect. In this example, eleven out of sixteen atoms are nonempty (hatched rows of the table, coarse diamonds pattern for active atoms and fine diamonds pattern for inactive atoms), and the five empty atoms (white rows of the table) are shown by a triangular arrow next to them. Notice that the outcome of $E_1$ and $E_2$ are identical in terms of every atoms;' classification (empty and nonempty alike), which means the Boolean formulae for $E_1$ and $E_2$ is logically equivalent to the DNF formed earlier from the three active nonempty atoms. However, $E_3$ differs from them in terms of two atoms 0101 and 1101 (e.g., *101), circled in the table. Nonetheless, because these two atoms are empty, meaning that they do not correspond to a measurable volumetric region in the physical space, their inclusion in or exclusion from the final state does not matter. Hence, logical equivalence with the said DNF is too strong a condition for feasibility of process plans. A weaker condition called herein "conditional equivalence" may be defined in which equivalence is defined with respect to a proper subset of the truth table. In other words, while "strict equivalence" means equal outcomes for a subset of the truth table corresponding to nonempty atoms only, i.e., two Boolean functions are conditionally equivalent if and only if the nonempty atoms classify the same way against their outcomes (e.g., as active vs. inactive). The inclusion of empty atoms does not matter for conditional equivalence. Other embodiments are possible in which different forms of conditional equivalence are defined.

FIG. 19 shows the atomic decomposition for the same example as in FIG. 18, where nonempty atoms are shown by different hatch patterns (coarse diamonds pattern for active atoms and fine diamonds pattern for inactive atoms, as before). The substitution of conjunctive clauses (in terms of four primitives and their complements) for the three active atoms into the disjunctive formula for the as-manufactured target $S_M$ results in what we call a "minimal" DNF. The minimal DNF is logically equivalent to two of the three feasible plans ($E_1$ and $E_2$) while $E_3$, despite being feasible, is not strictly equivalent to the minimal DNF. A weaker form of this equivalence may be defined to check for feasibility.

Figure 20:
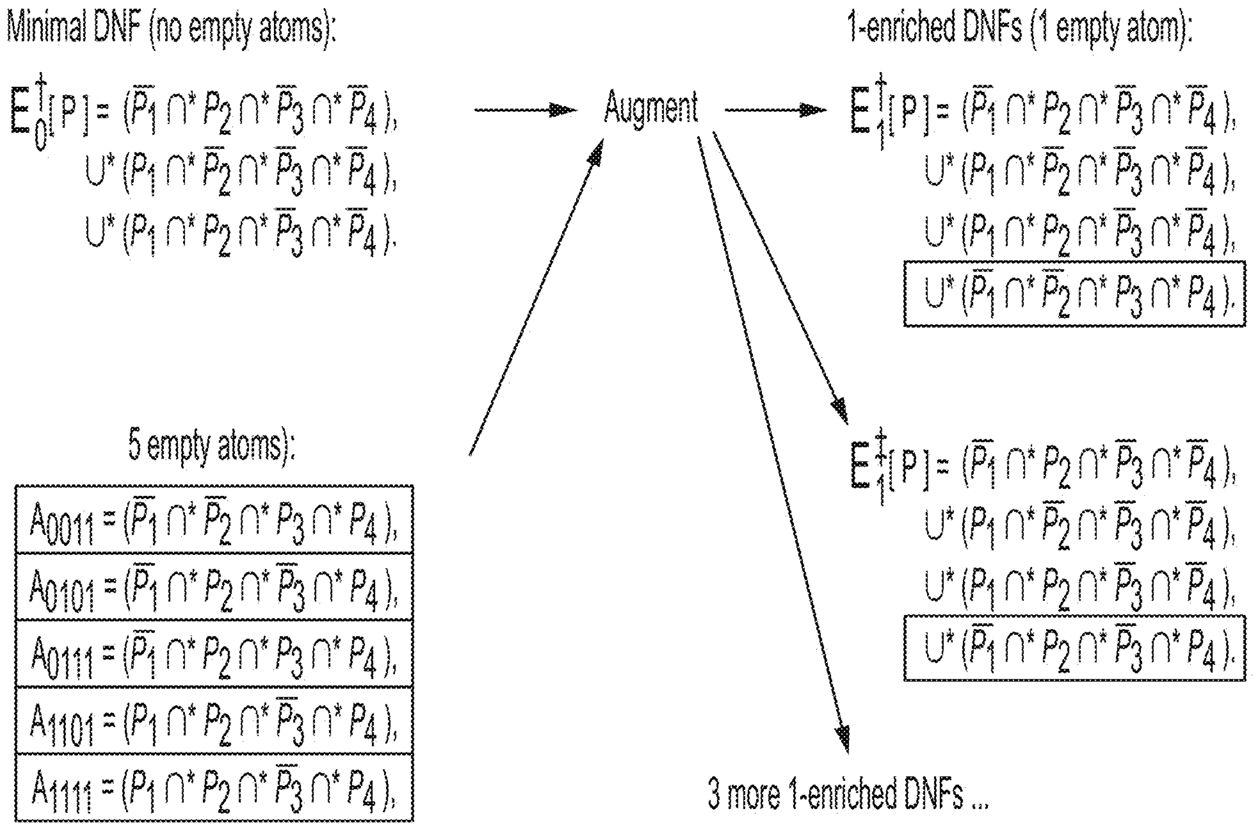
FIGS. 20 and 21 are diagrams showing how the minimal DNF in FIG. 18 may be augmented by one or more empty atoms to produce enriched DNFs.
Figure 21:
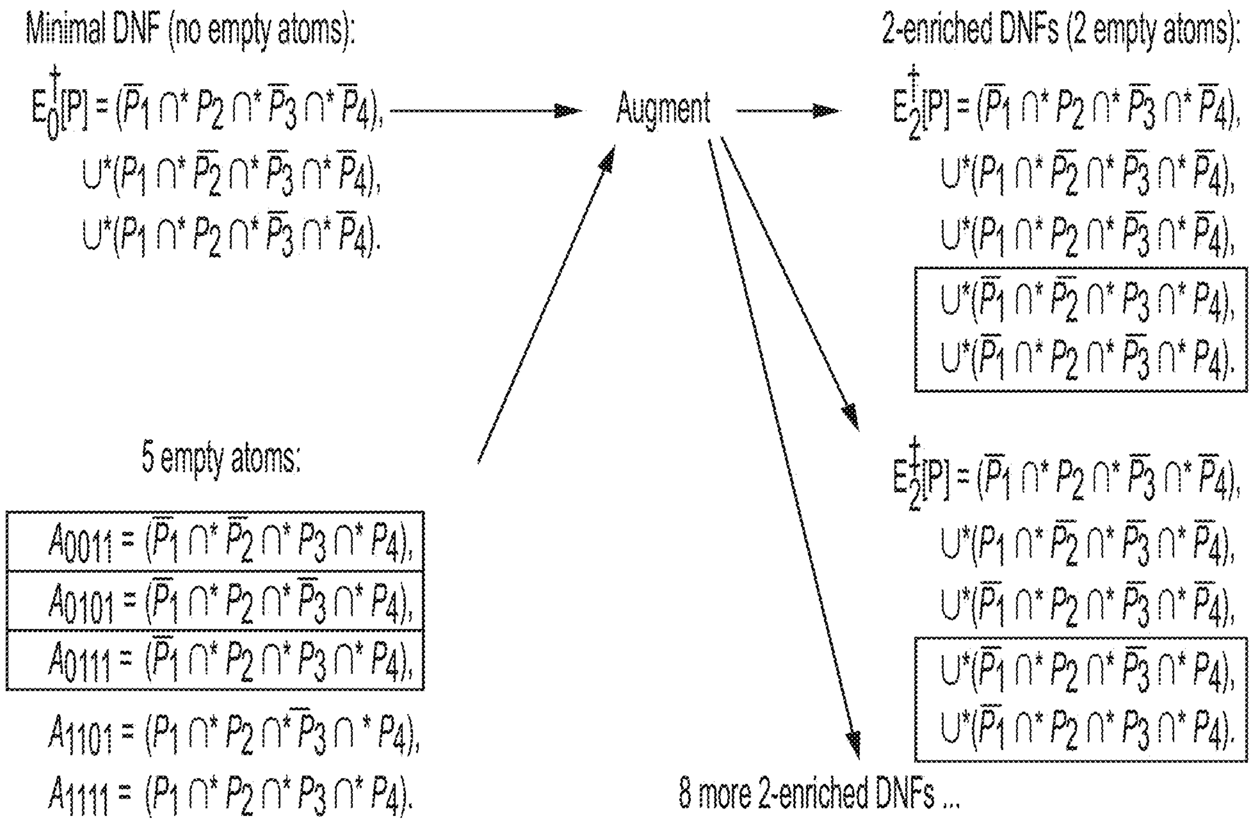

FIGS. 20 and 21 show how the minimal DNF can be converted to many "enriched" DNFs by disjunting it with conjunctive clauses for the empty atoms. For the example in FIGS. 18 and 19, there are five empty atoms, hence $2^5$=32 possible ways to enrich the minimal DNF with a selection of one, two, three, four, or five empty atoms. FIG. 20 shows one of five possible 1-enriched DNFs (e.g., using one of five empty atoms). FIG. 21 shows one of ten possible 2-enriched DNFs (e.g., using two of five empty atoms). FIG. 22 shows how these different enriched DNFs may be converted to proper read-once form using existing clique-finding and cograph-to-cotree mapping algorithms in one possible embodiment. The resulting read-once formulae can be checked for validity, e.g., whether they are anti-balanced and make proper use of primitives (e.g., do not use AM primitives in a subtractive manner). The valid formulae will be feasible by construction. In another embodiment, this procedure can be reversed by enumerating valid formulae as read-once permutations of the actions, factorizing them into a DNF form, and checking the DNF form against the minimal and enriched DNFs corresponding to the as-manufactured target $S_M$ to select out the feasible formula. In either embodiment, the feasible formulae may be further shortlisted to find cost-effective or optimal plans.

One challenge with embodiments that need to enumerate empty atoms is that the number of empty atoms, thus the number of possible ways to produce enriched DNFs may be large in general. The total number of (empty and nonempty) atoms grows exponentially with primitives. A constant upper-bound on the number of nonempty atoms is enforced by the resolution in geometric representation when computing atomic decomposition. For example, if one uses a voxel-based representation of the space to discover nonempty atoms in a possible embodiment, one will miss every atom that is smaller than a voxel as it falls in between the finitely sampled points, thus deemed empty for practical purposes. Thus, the number of nonempty atoms is capped by the total number of voxels or sample points. Furthermore, one may define tolerance zones whose thickness may extend to several voxels, and consider the atoms that fall completely inside the tolerance zone to be "almost empty" meaning that their inclusion or exclusion in the final state does not matter, e.g., they can be active or inactive without affecting the feasibility of a candidate process plan. Since the number of total (empty and nonempty) atoms grows exponentially with the number of primitives while the number of nonempty atoms is capped by a constant, the number of empty atoms grows exponentially as well.

In the remaining part of this document, we present an alternative embodiment that makes use of nonempty atoms only, thus does not suffer from the exponential growth of the number of empty atoms when there are a large number of primitives. Every valid HM process plan can be compactly represented as a totally (e.g., linearly) ordered set of primitives, as exemplified in FIG. 23, where every order relation $P_i \prec P_j$ means that the i-th action (using the i-th primitive) is executed before the j-th action (using the j-th primitive) in the process plan. FIG. 23 shows how the three feasible process plans in FIG. 18-22 can be rewritten as total orders.

Figure 24:
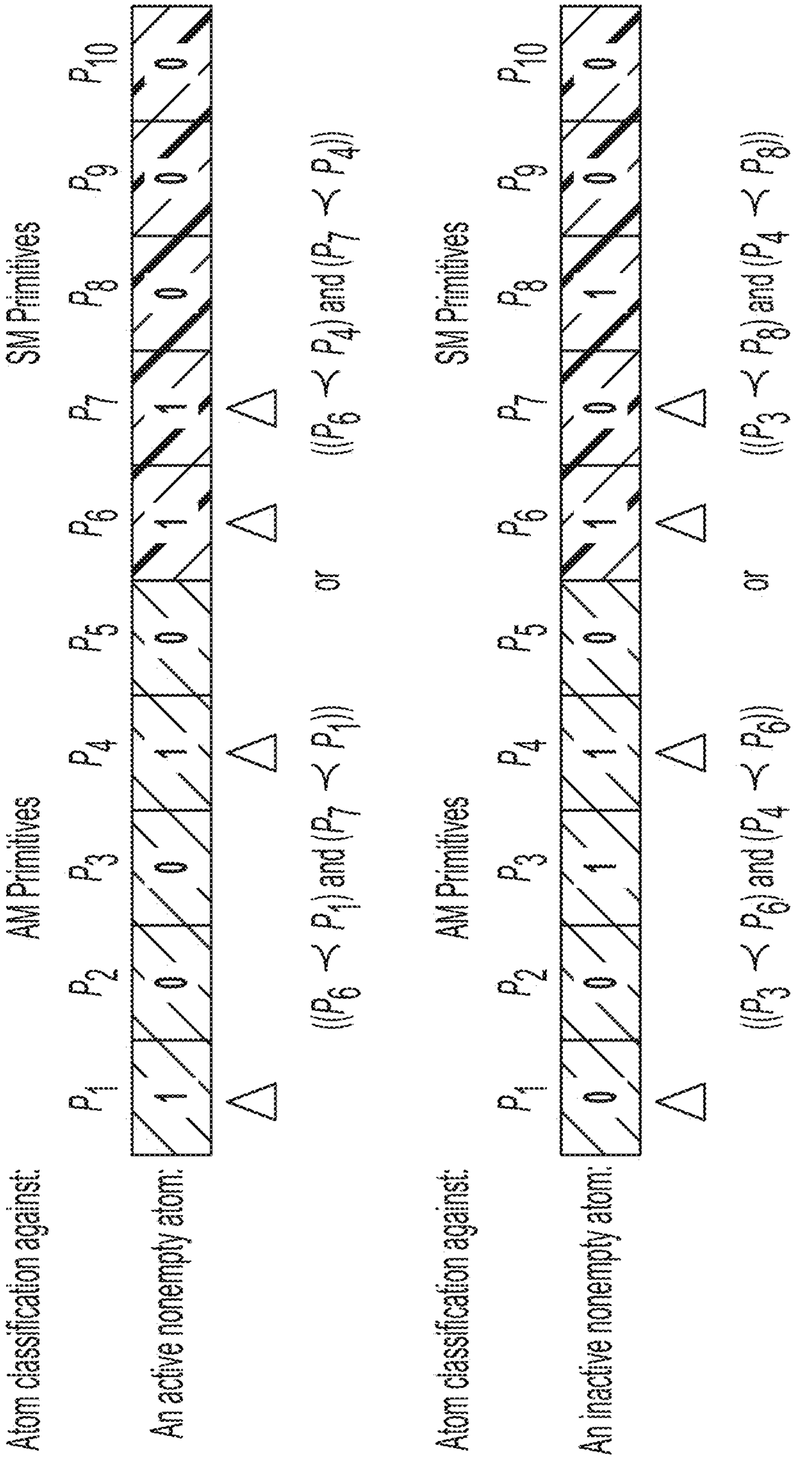
FIG. 24 is a diagram showing how analyzing the logical encoding of active and inactive atoms, defined as atoms that will end up inside and outside the as-manufactured part, respectively, may be converted to a collection of partial order constraints.

FIG. 24 shows two strands of binary encodings, one for a hypothetically active atom, and one for a hypothetically inactive atom, classified against 10 primitives, the first five of which $P_1$-$P_5$ are AM primitives and the second five $P_6$-$P_{10}$ are $S_M$ primitives. Each nonempty active or inactive atom's encoding imposes a set of partial ordering constraints on a feasible process plan. The rules of the ordering are as follows: a given point in 3D ends up: (a) inside the target as-manufactured shape, if and only if at least one AM primitive that includes the point appears in the process plan after every SM primitive that includes the point; and (b) outside the target as-manufactured shape, if and only if at least one SM primitive that includes the point appears in the process plan after every AM primitive that includes the point. Atoms are the smallest regions of space that are classified the same against all primitives in terms of inclusion, e.g., every point is a representative of all the points in an atom with respect to inclusion in primitives. A given nonempty atom ends up: (a) active (e.g., included in the target as-manufactured sub-collection of atoms) if and only at least one AM primitive that contains the atom appears in the process plan after every SM primitive that includes the atom, such that AM dominates SM; and (b) inactive (e.g., excluded from the target as-manufactured sub-collection of atoms) if an only if at least one SM primitive that contains the atom appears in the process plan after every AM primitive that includes the atom, such that SM dominates AM. The domination is only local, e.g., with respect to one atom at-a-time.

For example, consider the active nonempty atom in FIG. 24, whose binary encoding 10010-11000 (with a dash to emphasize the separation of AM and SM digits) indicates inclusion in AM primitives $P_1$ and $P_4$, inclusion in SM primitives $P_6$ and $P_7$, and exclusion in all other primitives. To have this atom end up active at the end of a process plan (e.g., total order of primitives), at least one AM primitive should succeed both SM primitives, e.g., either $P_6 \prec P_1$ and $P_7 \prec P_1$ or $P_6 \prec P_4$ and $P_7 \prec P_4$ (or both).

Similarly, consider the nonempty inactive atom in FIG. 24, whose binary encoding 00110-10100 (with a dash to emphasize the separation of AM and SM digits) indicates inclusion in AM primitives $P_3$ and $P_4$, inclusion in SM primitives $P_6$ and $P_7$, and exclusion in all other primitives. To have this atom end up inactive at the end of a process plan (e.g., total order of primitives), at least one SM primitive should succeed both AM primitives, e.g., either $P_3 \prec P_6$ and $P_4 \prec P_6$ or $P_3 \prec P_8$ and $P_4 \prec P_8$ (or both).

Below, we describe an alternative embodiment based on a "declarative" approach to HM process planning, in contrast to the "imperative" approach described earlier in FIGS. 18-22. In the imperative approach, all atoms including empty atoms whose number may grow exponentially with the number of primitives, need to be considered to generate a process plan by Boolean function learning from (minimal and enriched) DNFs. In fact, empty atoms play an important role as they may produce process plans that are logically equivalent to enriched DNFs, which are logically different from minimal DNFs. In fact, enriching the minimal DNF with one or more empty atoms may very well be the only way to generate feasible plans, as often times there exists no feasible process plan that is logically equivalent to the minimal DNF. In the declarative approach, on the other hand, only nonempty atoms need to be considered, whose number is capped by a constant determined by spatial resolution as explained earlier. Rather than starting from one Boolean function and enumerating all possible enrichments of it, we reverse the process by cutting down the feasible space of all possible Boolean functions by adding constraints. Each constraint shrinks the feasible space by ruling out some Boolean functions, represented by totally-ordered sets in FIG. 23.

In FIG. 25, the truth table from FIG. 18 is repeated. However, although the empty atoms (white rows of the table) are shown for the sake of completeness, we only need the nonempty active or inactive atoms (hatched rows of the table). In one possible embodiment, an interpreter algorithm processes all active and inactive atoms and compiles a set of declarative specifications based on the rules described over FIG. 24, leading to a list of logical statements including "if-then" statements in terms of whether specific primitives are used and partial order constraints, e.g., the AM primitive $P_1$ is the only primitive that includes the active atom encoded 10-00, thus the only way for this atom to end up active in the final state is that "P1 is used." Another example is that the inactive atom 10-11 can be brought into existence only by $P_1$, the only AM primitive that includes it, and can be taken out by either of the two $S_M$ primitive $P_3$ or $P_4$ (or both) that include it, and at least one of $P_3$ and $P_4$ should succeed $P_1$ in a given total ordering for that ordering to constitute a feasible process plan, thus "if $P_1$ is used, then at least one of the following is true: (a) $P_3$ is used and $P_1 \prec P_3$; or (b) $P_4$ is used and $P_1 \prec P_4$; (or both).

In one possible embodiment, the implied partial order constraints can be expressed as a directed bi-partite graph in which one part (e.g., the left side) constitutes nodes representing and labeled after AM primitives and the other part (e.g., the right side) constitutes nodes representing and labeled after SM primitives. A partial order constraint $P_i \prec P_i$ is represented by a directed edge (e.g., arrow) from i-th node on one side to the j-th node on the other side. The HM process planning can thus be reformulated as "flattening" this graph into a linear uni-directional graph, e.g., a graph in which the nodes are all placed on a straight line and the arrows are all directed in one direction (e.g., from left to right). The flattening should be done in such a way that the original partial order constraints are satisfied, while additional partial order relations may be added.

Figure 26:
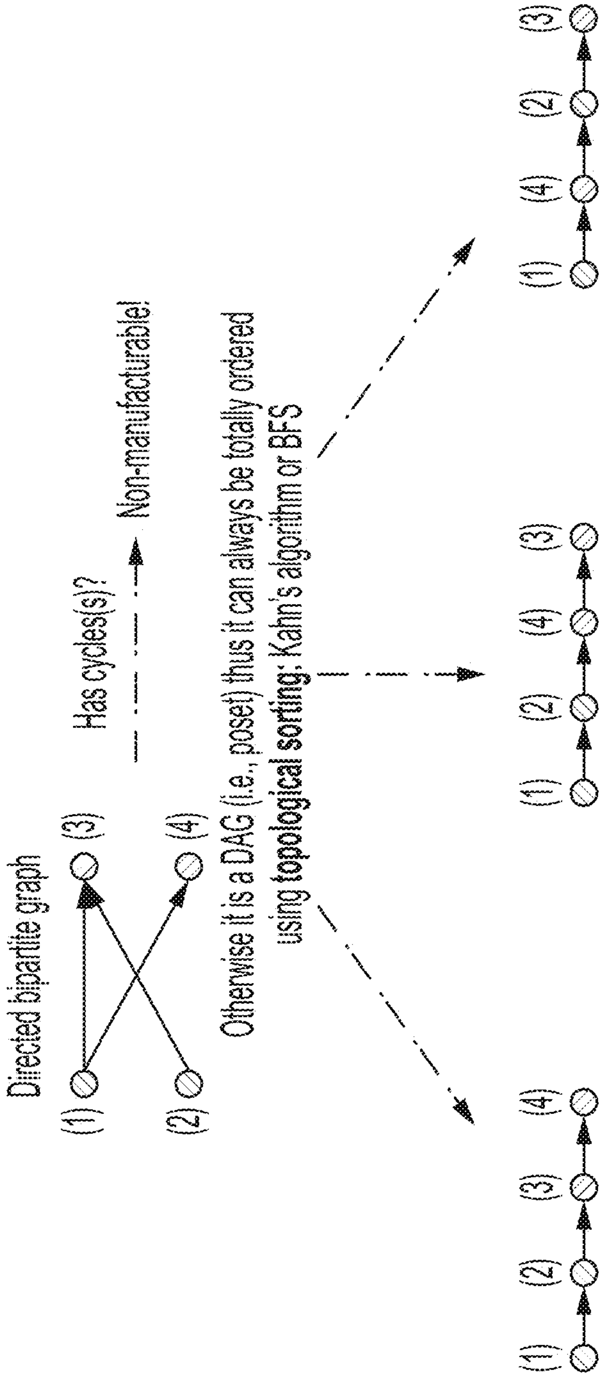
FIGS. 26 and 27 are diagrams showing how the bi-partite graph of FIG. 25 can be analyzed for an early manufacturability test, and, if it passes the test, can be mapped to three different total orders corresponding to three valid process plans, in two different possible embodiments.

As described earlier, a "weak" test for manufacturability with a given set of primitives was the existence of a sub-collection of nonempty atoms (called active atoms), arising from canonical intersection of those primitives, that correspond to the desired final state, as the existence of such a collection is a necessary condition for manufacturability. A "strong" test for manufacturability with the given set of primitives can be conceived as one's ability to flatten the directed bi-partite graph obtained from analyzing the nonempty (both active and inactive) atoms described earlier. The necessary and sufficient condition for this ability, and thus for manufacturability, is that the directed bi-partite graph is acyclic, e.g., has no sequence of directed edges $P_{i_1} \prec P_{i_2}$, $P_{i_2} \prec P_{i_3}$, . . . , $P_{i_{n-1}} \prec P_{i_n}$, closed by $P_{i_n} \prec P_{i_1}$. Such a graph is called a directed acyclic graph (DAG). Every DAG represents a partially-ordered set (PO-set), in this case, of primitives. A directed graph that has cycles does not represent a PO-set, because the existence of the cycle together with associativity of the order relation (e.g., if $P_i \prec P_j$ and $P_j \prec P_k$ then $P_i \prec P_k$) implies that $P_i \prec P_j$ and $P_j \prec P_i$ at the same time for all $P_i$ and $P_j$ in the cycle, depending on where the cycle traversal starts and ends, which means $P_i = P_j$ due to reflexivity, leading to a contradiction. A PO-set represented by a DAG, is always a subset of a totally-ordered set (TO-set) obtained upon the addition of extra order relation. Hence, the necessary and sufficient condition for the existence of a feasible process plan as a TO-set is that the graph is acyclic, as illustrated in FIG. 26. Process planning thus reduces to mapping a PO-set to one or more TO-sets that satisfy the PO-set, is called "topological sorting" where each TO-set is a "topological sort." There are standard and optimal algorithms such as Kahn's algorithm or breadth-first search (BFS) for topological sorting, any number of which may be used in different embodiments.

Figure 27:
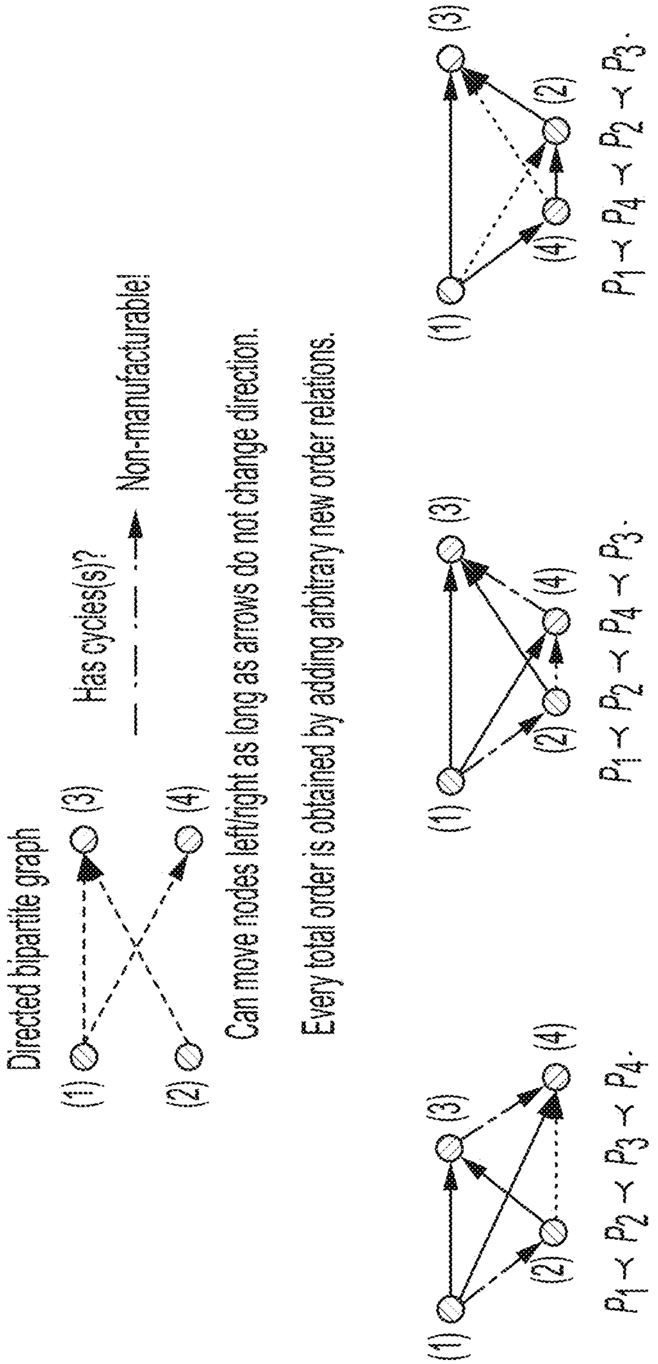
Figure 28:
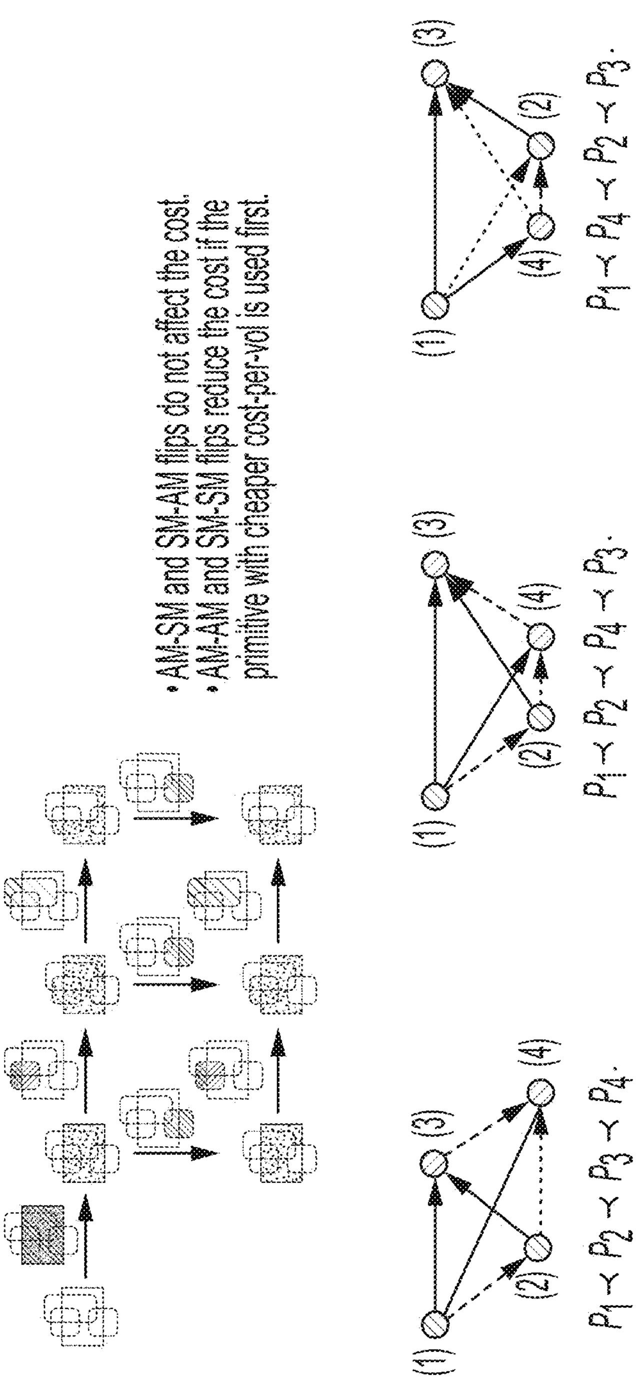
FIG. 28 is a diagram showing how the three total orders in FIG. 27 correspond to the three paths on corresponding to three process plans in FIGS. 15 and 16.

FIG. 27 shows a different view of FIG. 26 in which the flattening of a DAG is represented by adding extra partial order relations, shown via dashed arrows. FIG. 28 shows how the three TO-sets illustrated in FIGS. 23, 26, and 27 correspond to the three paths from the initial state (nothing) to the final state (active atoms in as-manufactured outcome), illustrated along the state space diagram repeated from FIGS. 15 and 16.

In one possible embodiment, one may achieve topological sorting by moving the nodes representing primitives horizontally, while making sure the original partial order constraints, shown via solid arrows, never flip their directions, e.g., all remain pointing from left to right. The additional primitive order relations are implied by the relative horizontal location of the nodes, while vertical locations are irrelevant. Two primitives are "flipped" if they pass each other and change their order in the TO-set in a way that feasibility constraints remain satisfied. Two primitives are "flipped" if they pass each other and change their order in the TO-set in a way that feasibility constraints remain satisfied. In one possible embodiment, the rules of flipping may be as follows: (a) unimodal pairs of primitives (e.g., two AM primitives or two SM primitives) may be flipped without affecting the feasibility of the process plan, because unimodal pairs or sub-sequences are permutative as explained earlier; and (b) AM and SM primitives that do not intersect, e.g., share no nonempty atom, may be flipped without affecting the feasibility of the process plan. In each case, the cost may change as the actual atoms being added or removed may change, although the final outcome will not change.

Figure 29:
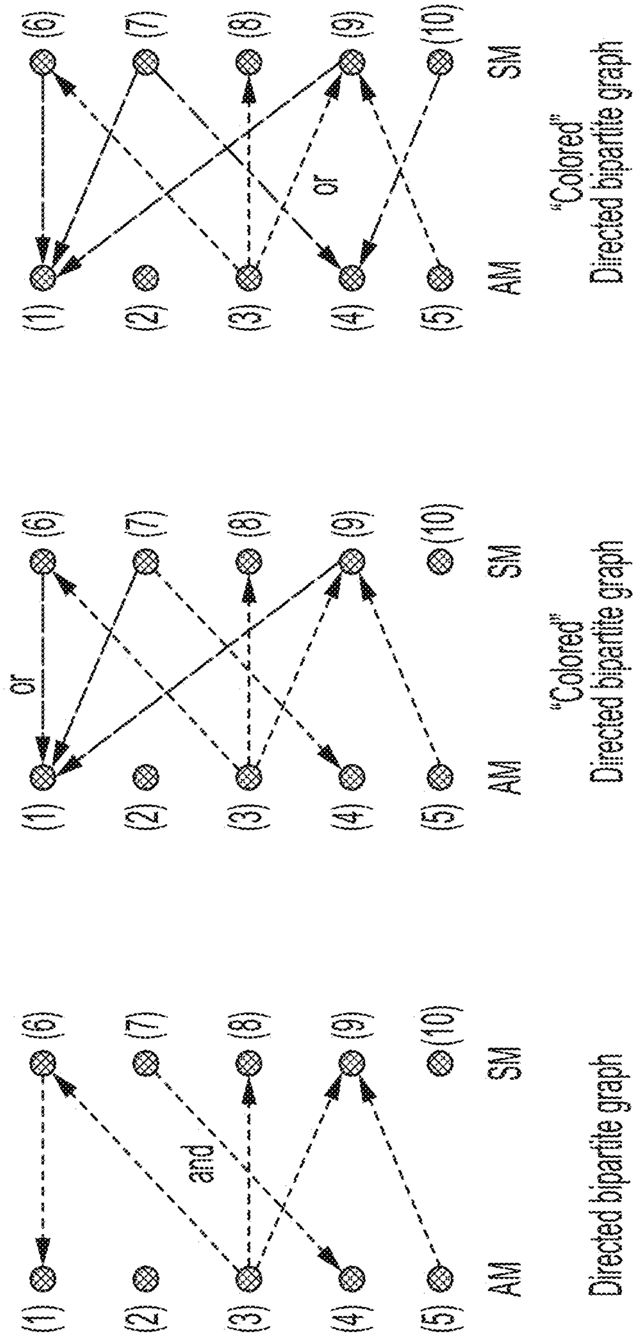
FIG. 29 is a diagram showing examples of a "colored" bi-partite graph in which each color represents a grouping of partial order constraints with conjunctions among them, whereas different groups are combined via disjunctions.

FIG. 29 shows another example of a directed bi-partite graph on the left. Implicitly, there is a conjunction (e.g., logical "and" statements) among all partial order constraints represented by a collection of directed edges (e.g., arrows) in the graph. However, as described earlier, the examination of nonempty active and inactive atoms may lead to disjunctions (e.g., logical "or" statements) among the conjunctive clauses. Such combinations may be represented by a "colored" bi-partite graph, where each color depicts a collection of primitive order relations with one logical operator (e.g., "and") while there is a different logical operator (e.g., "or") implicit among different colors, as illustrated for two colors and three colors represented by solid, dashed, and dash-dotted groups of arrows on the middle and right graphs in FIG. 29.

Figure 30:
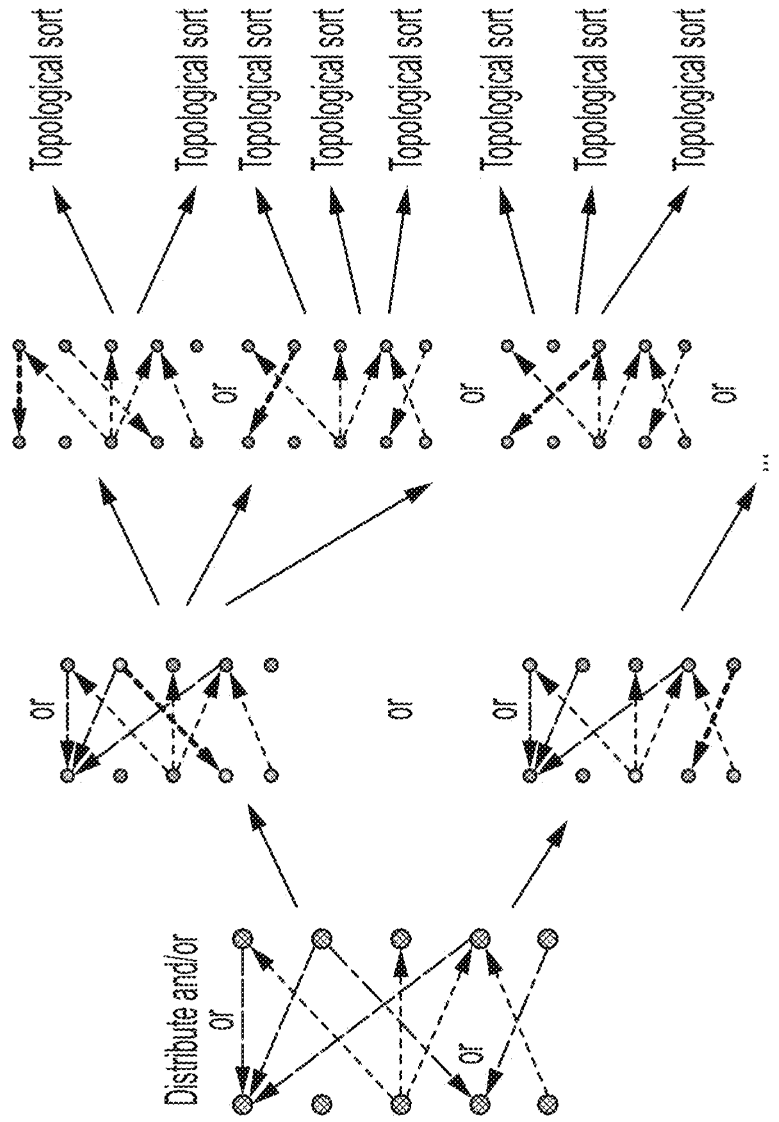
FIG. 30 is a diagram showing how a "colored" bi-partite graph may be converted to several ordinary (e.g., not colored) bi-partite graphs, each of which may be converted to total orders using the approach shown in FIG. 26 for one possible embodiment.
Figure 31:
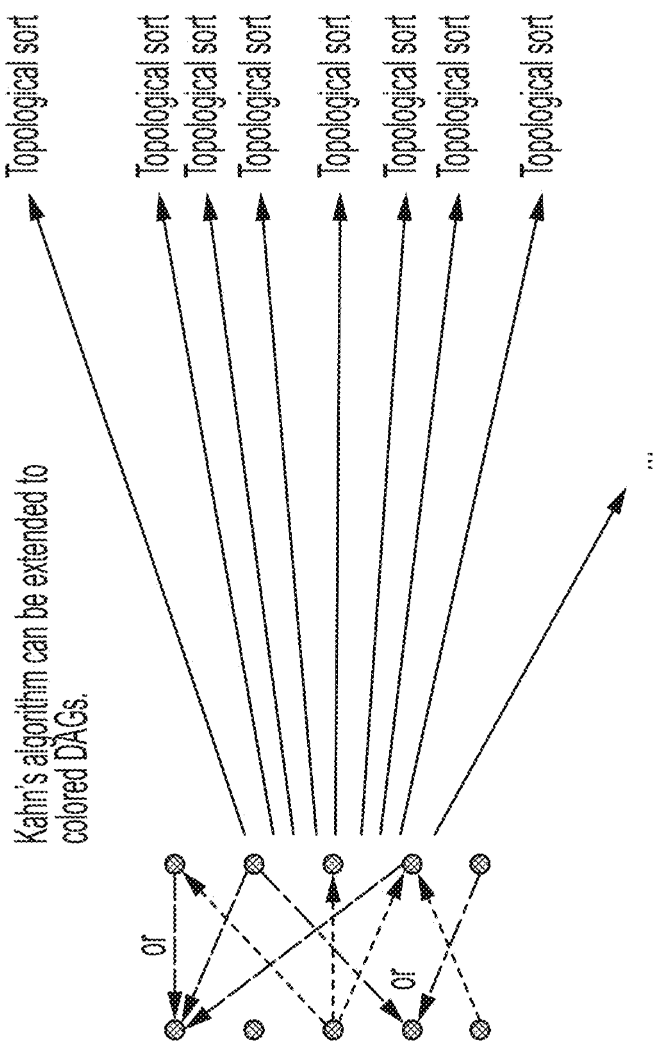
FIG. 31 is a diagram showing how a "colored" bi-partite graph may be directly converted to total orders using a generalization of the approach shown in FIG. 26 for another possible embodiment.

FIG. 30 shows how a "colored" bi-partite graph may be represented as a collection of ordinary (e.g., not colored) bi-partite graphs by recursively removing the colors in one possible embodiment. For example, a graph with a pair of similarly colored arrows with an "or" operator between them can be split into two graphs, each containing one of the two arrows, thereby removing the color. This process may be repeated recursively until one obtains a collection of ordinary bi-partite graphs, each of which may be tested for being acyclic to represent a PO-set and flattened into a TO-set via topological sorting. In the worst-case scenario when most primitives intersect one another, leading to an atomic decomposition with lots of 1 digits in the binary encoding of nonempty atoms, this process may lead to an exponential number of topological sorting sessions in the number of primitives. However, if the primitives are constructed in such a way that their intersections are sparse, e.g., the number of 0 digits in the binary encoding of nonempty atoms, the number of "or" groups (e.g., colors) will be small, making the splitting approach reasonably scalable. FIG. 31 illustrates an alternative embodiment in which the standard topological sorting algorithms for ordinary (e.g., no colored) directed graphs may be extended to handle colored directed graphs without splitting.

FIG. 31 shows that the directed bi-partite graphs arising from the analysis of nonempty active and inactive atoms have a special property that may be exploited for more efficient topological sorting with or without splitting. Every disjunction of conjunctions (e.g., "and" statements combined with "or") that results from applying the rules illustrated earlier in FIG. 24 may be rewritten in terms of conjunctions (e.g., "and" statements alone) combined with maximum operator. The maximum of two primitives $P_i$ and $P_j$, denoted by $\max\{P_i, P_j\}$ is the primitive that should appear later in a feasible process plan, e.g., $\max\{P_i, P_j\} = P_j$ if $P_i \prec P_j$. The partial order constraints obtained by asserting domination of AM over SM (for active atoms) and SM over AM (for inactive atoms) can always be expressed in terms of the maximum operator because among all primitives containing a given atom, only the maximum (e.g., the one that appears last in the process plan) matters as it determines whether the atom ends up active or inactive. In another embodiment, one may achieve a similar effect using minimum operator, which captures the primitive that appears earlier in a process plan, or combinations of minimum and maximum operators. Restatement of combined ("and", "or") statements in terms of at least one of combined ("and", "max"), ("or", "max"), ("and", "min"), and ("and", "min") enables alternative embodiments for flattening the PO-sets in TO-sets.

For example, the partial order constraints obtained from examination of an active atom encoded by 10010-11000 in FIG. 24 may be rewritten in FIG. 31 as the conjunction of $P_6 \prec \max\{P_1, P_4\}$ and $P_7 \prec \max\{P_1, P_4\}$ because whichever of the AM primitives $P_1$ or $P_4$ that comes later in the process plan, defined by $\max\{P_1, P_4\}$, should not appear before any of the SM primitives $P_6$ or $P_7$ that would undo the deposition.

Similarly, the partial order constraints obtained from examination of an inactive atom encoded by 00110-10100 in FIG. 24 may be rewritten in FIG. 31 as the conjunction of $P_3 \prec \max\{P_6, P_8\}$ and $P_4 \prec \max\{P_6, P_8\}$ because whichever of the SM primitives $P_6$ or $P_8$ that comes later in the process plan, defined by $\max\{P_6, P_8\}$, should not appear before any of the AM primitives $P_3$ or $P_4$ that would undo the removal.

Figure 32:
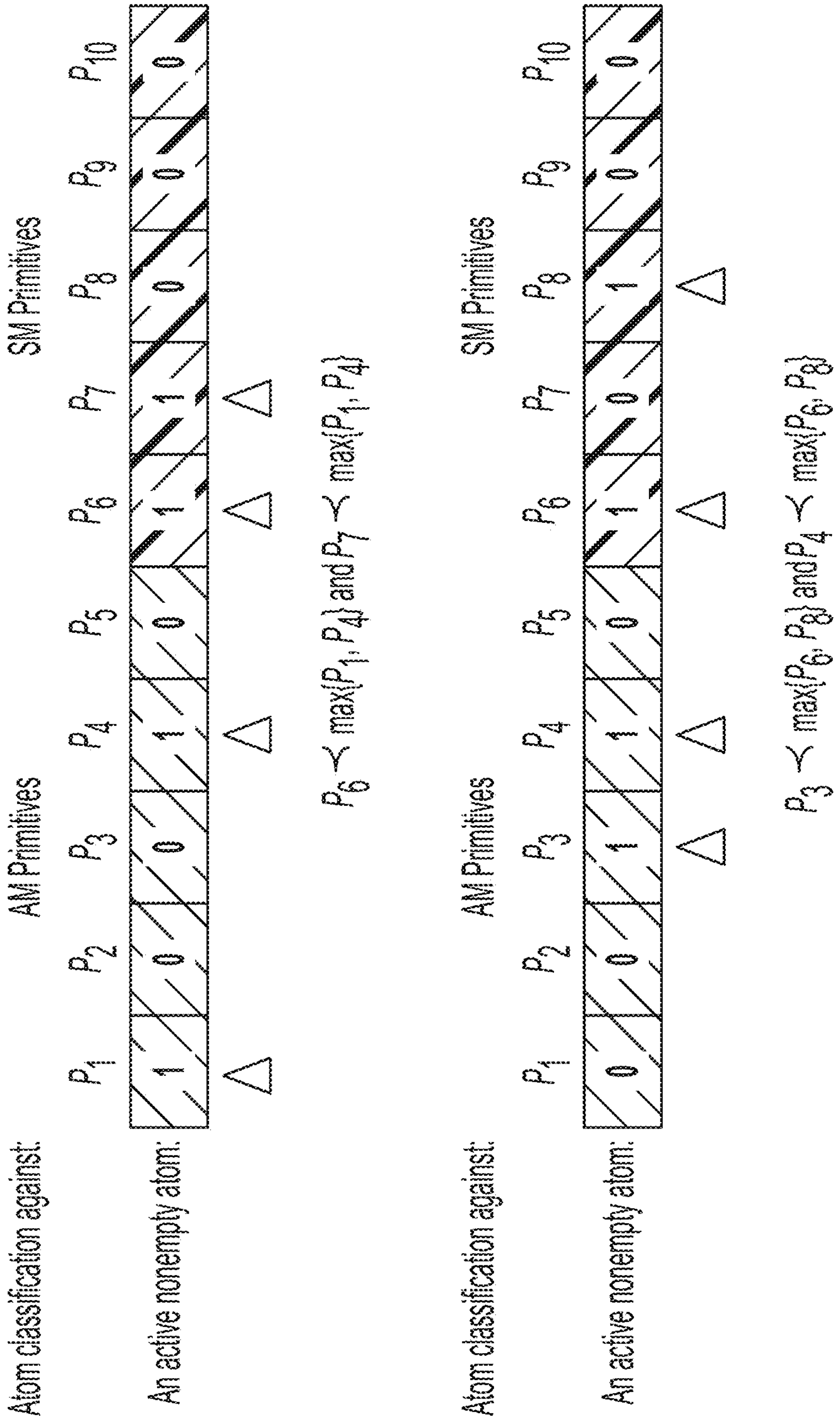
FIG. 32 is a diagram showing an alternative representation of the partial order constraints in FIG. 24 to enable alternative approaches to those of FIGS. 30 and 31.
Figure 33:
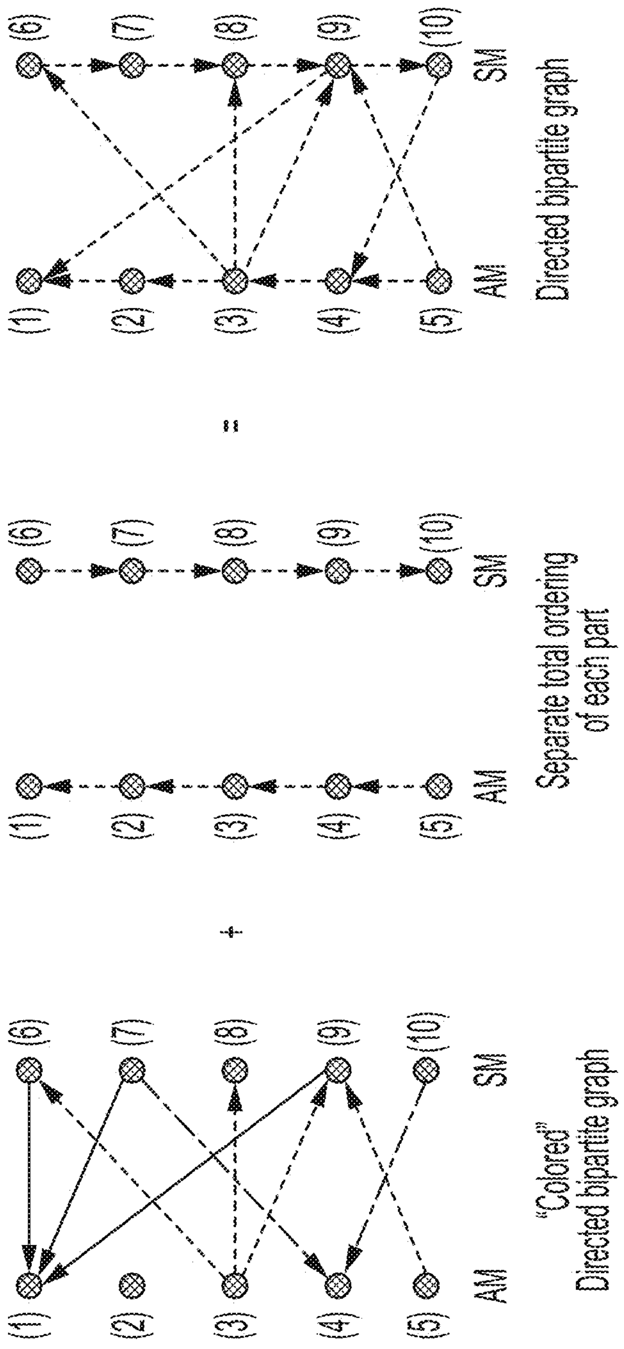
FIG. 33 is a diagram showing how a "colored" bi-partite graph and a total ordering of each part of the graph representing additive and subtractive primitives lead to an ordinary (e.g., not colored) bi-partite graph, which can be converted to total orders using the approach shown in FIG. 26 for one possible embodiment.

FIG. 32 illustrates another embodiment in which a "colored" bi-partite graph, equivalent to many (potentially exponential number of) ordinary (e.g., not colored) bi-partite graphs may be reduced to a single ordinary bi-partite graph by pre-ordering the AM primitives among themselves and SM primitives among themselves. Note that the maximum statements described earlier with examples on FIG. 31 involve a pair of AM or a pair of SM primitives, but never an AM primitive paired with an SM primitive or vice versa because of the competition among primitives of the same kind to determine the final fate of a nonempty atom as active or inactive, respectively. If both sides of the bi-partite graph are totally ordered, the maximums are disambiguated, thus the partial order constraints are stated purely in conjunctive terms (e.g., via "and") or purely in disjunctive terms (e.g., via "or") and the colors in the graph disappear. In other words, if one can perform unimodal AM and SM process planning, e.g., once for all AM primitives (pretending SM does not exist) and once for SM primitives (pretending AM does not exist) separately, one can do multimodal process planning, shuffling both AM and SM in the most efficient way with a single topological sorting. The unimodal process planning may be performed using any unimodal process planner from prior art.

In one embodiment, the unimodal TO-sets on each side may be obtained by the following rules: (a) a pair of unimodal (both-AM or both-SM) primitives that do not intersect may appear in any order in the unimodal TO-set without affecting the cost; and (b) a pair of unimodal (both-AM or both-SM) primitives that intersect should be ordered such that the primitive with the smaller cost factor precedes the primitive with the larger cost factor. For AM actions, this commonly means using 3D printing heads with coarser minimum feature size but faster material feed earlier than high-precision 3D printing heads. For SM actions, this commonly means using roughing machine tools with less precision and surface quality but faster chip removal before finishing machine tools. Once the two unimodal TO-sets are obtained, the multimodal TO-set is obtained by first merging the two unimodal TO-sets with the partial order constraints leading to a single PO-set (e.g., a single-color DAG) and then flattening the DAG using a single topological sorting session. Although this heuristic approach may not generate all feasible HM process plans, it may generate the most cost-effective HM process plans more rapidly.

Note that the above techniques may produce more than one feasible HM process plan, e.g., a valid HM process plan that satisfies all partial order constraints thus generates the desired as-manufactured outcome specified by classifying nonempty atoms as active and inactive. In such as case, a cost model may be used to determine the relative cost of each HM process plan (e.g., different TO-set that satisfy the same PO-sets). In one possible embodiment, each primitive is assigned with a "primitive cost factor" that determines its cost per unit volume of actual deposited or removed material, for AM and SM actions, respectively. The cost factor may be defined in terms of cost of materials, machine hour rates, operator and personnel hourly wages, etc. Each atom, on the other hand, may be assigned with a "atom cost share" which may be proportional to its volume, length of a space-filling curve inside its volume (e.g., G-code trajectory), etc. The total cost of an HM process plan may be defined as the sum of the costs of its AM and SM actions, which, in turn, may be defined as the product of the corresponding primitives with the total deposited/removed volumes, computed as a sum of volumes of atoms that turn on/off due to the application of the primitives, respectively. The most cost-effective, optimal, or near-optimal HM process plans may be found by various different combinatorial search, discrete/continuous-variable optimization, machine learning, or heuristic exploration techniques.

Figure 34:
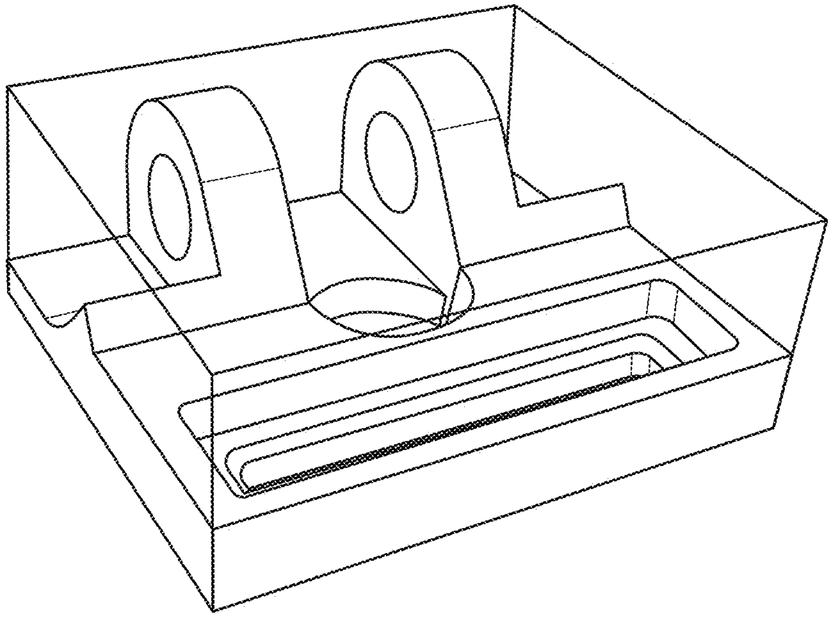
FIG. 34 is an example of a three-dimensional as-designed part that can be used as input to one possible embodiment.

FIG. 34 illustrates an example as-designed three-dimensional (3D) part geometry specified to the computer system via boundary representation (B-rep) in one possible embodiment. Other part representations are possible as long as the system is equipped with geometric reasoning algorithms to operate basic operations on the representation such as Boolean operations (e.g., set unions and intersections), rigid transformations (e.g., translations and rotations), and sweeps (e.g., Minkowski sum and difference) that are pertinent for geometric reasoning to compute the AM and SM primitives as described in the commonly owned U.S. Pat. No. 10,719,069.

Figure 35:
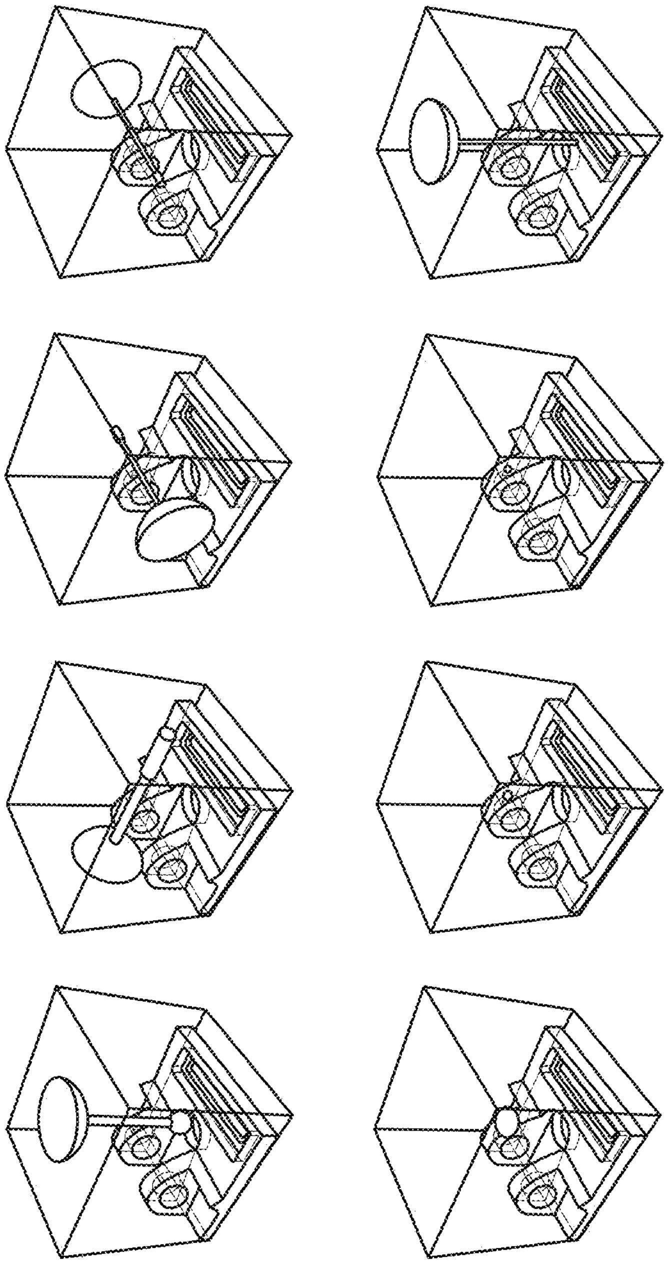
FIG. 35 shows different additive and subtractive tools in different orientations with respect to the as-designed part shown in FIG. 34 for one possible embodiment.

FIG. 35 illustrate eight different manufacturing tools. The left-most three of them on the bottom-row are AM tools represented by the shape of the AM instrument's minimum feature, which may represent a segment of an extruded filament, cross-section of a deposition nozzle or laser light, a melting pool shape, etc., in the given build orientation. The remaining five of them are milling tools oriented at different angles with respect to the as-design part. The right-most two of them on the top-row are the same tool at opposite directions, while the remaining three are different tools at different directions. The SM tools may be characterized by an active part (e.g., cutter, tool insert, etc.), that removes material as it is swept along the machine motion, and a passive part (e.g., tool holder, spindle, etc.). For SM actions, accessibility is the main criteria that determines the shape of primitives, e.g., by sweeping the active and passive part along a motion in which the latter should not collide with the workpiece and fixtures while the former generates the primitive. For AM actions, a passive part may be defined too (e.g., deposition nozzle) and support material requirements may be considered to define primitives.

Figure 36:
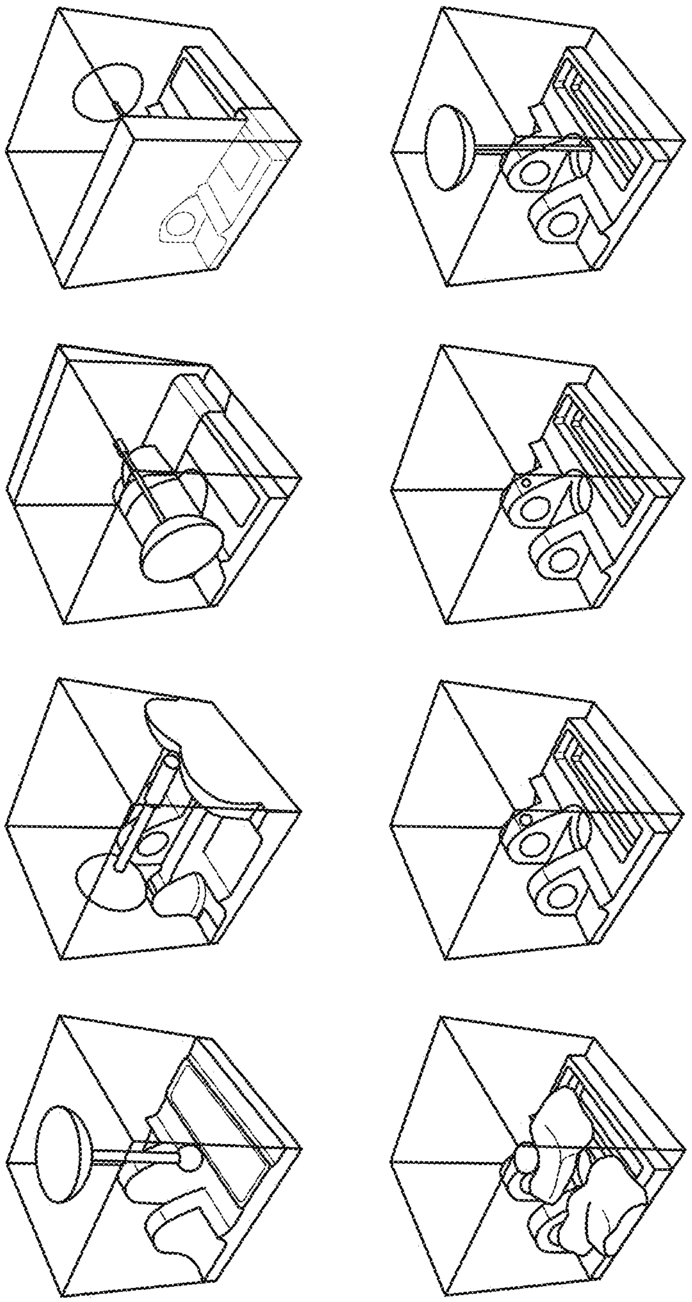
FIG. 36 shows how additive and subtractive manufacturing primitives are generated for each of the oriented tools shown in FIG. 35 against the as-designed part shown in FIG. 34 for one possible embodiment.
Figure 37:
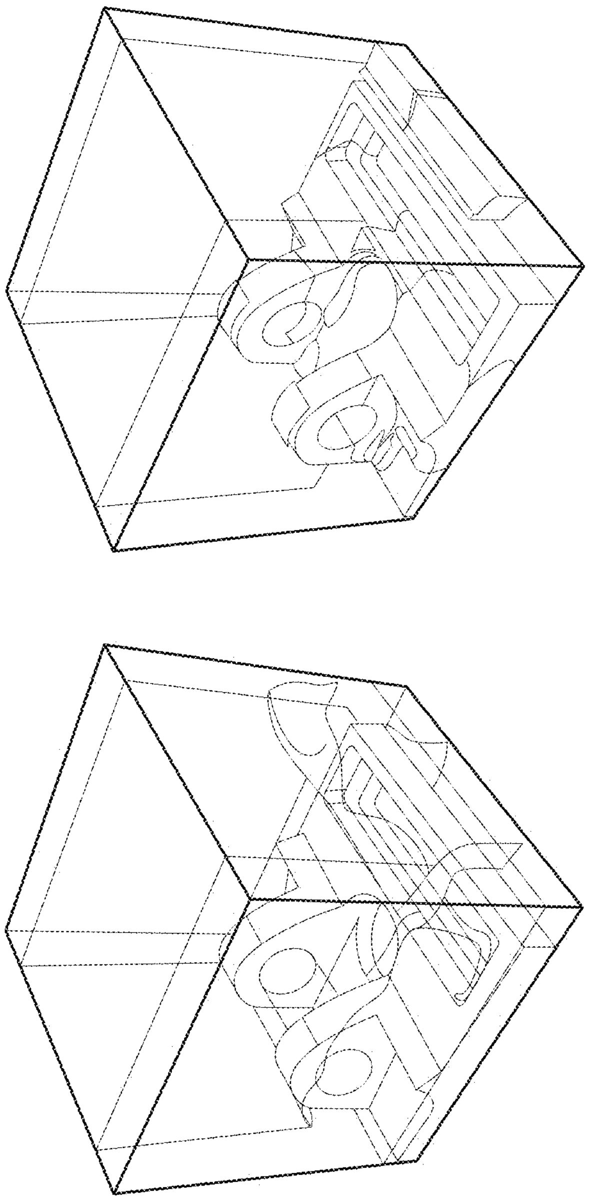
FIG. 37 shows primitives of FIG. 36 embedded in a single space and a few of the resulting manufacturing atoms in one possible embodiment.

FIG. 36 illustrates examples of AM and SM primitives corresponding to the AM and SM tools shown in FIG. 37. In this example, motions are assumed to be translational at a few discrete rotational configurations (e.g., fixturing/build directions) as in 3-axis milling machines or 3D printers. However, other embodiments with more complex rigid motions (e.g., combined translations and rotations) are possible, tailored to high-axis CNC or multi-tasking machines. The method and system described herein may be applied without any alterations to the symbolic/logical reasoning, although computing the best primitives would require reasoning in higher-dimensional motion spaces.

FIG. 37 illustrates the eight AM and SM primitives of FIG. 36 overlaid in the same coordinate system on the left. A few of the nonempty atoms obtained from the canonical decomposition of the 3D space in which these primitives are embedded are shown on the right.

Figure 38:
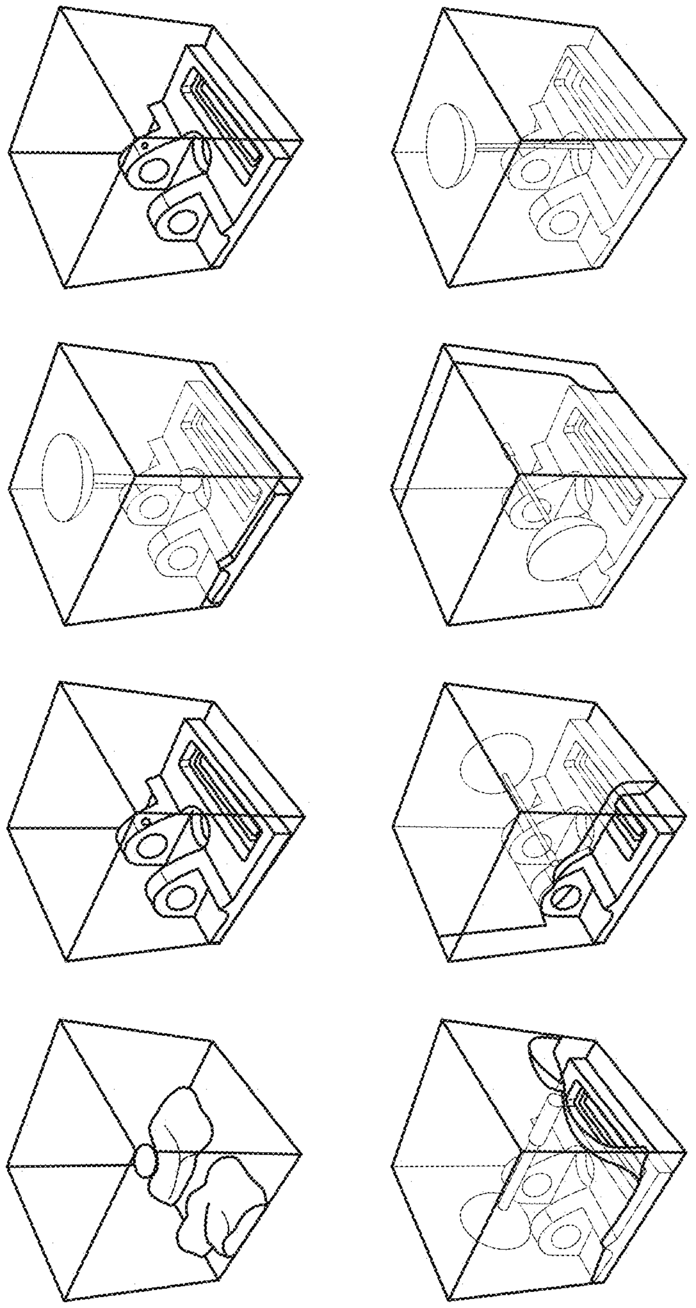
FIG. 38 shows the intermediate states of the evolving part, the applied additive and subtractive primitives, and the actual deposited or removed volumes in one possible embodiment.

FIG. 38 illustrates a feasible HM process plan generated by the method and system described herein. The process plan starts from the coarsest and cheapest AM action that produces a rough scaffolding of the final shape. The second action is also AM, with a smaller feature size and higher cost, adding more detailed features to the scaffold where the previous action could not produce the necessary forms. The third action is SM, using a form miller that removes the over-deposition of the second AM action. The fourth action is a fine AM to fill in the corners and other features of smallest size. The remaining four actions are SM, starting from a rough face cutter followed by a finer tool in opposite directions and ending with a thin milling tool to finish the smallest interior features.

Figure 39:
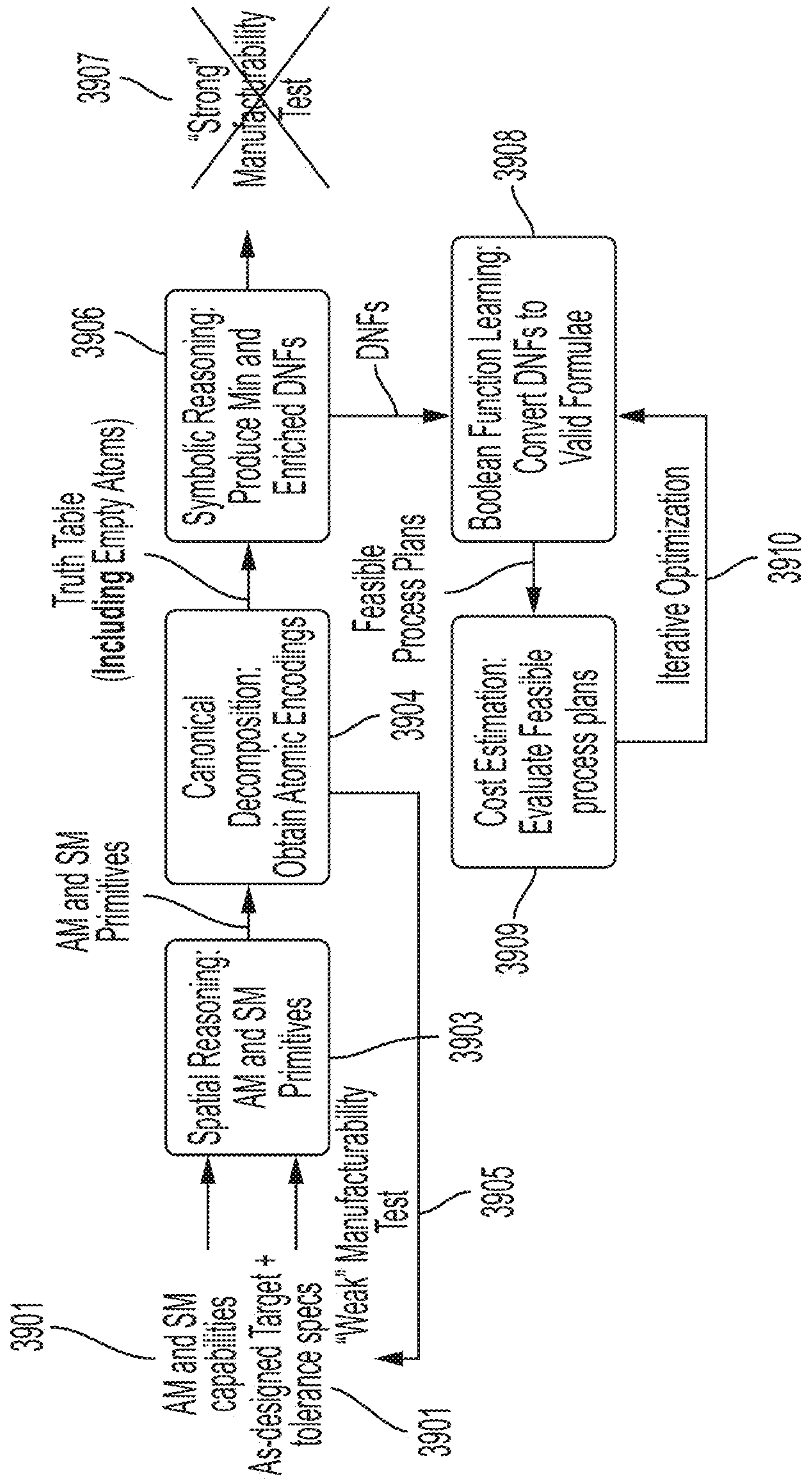
FIGS. 39 and 40 are block diagrams of imperative and declarative approaches to hybrid manufacturability tests and process planning.
Figure 40:
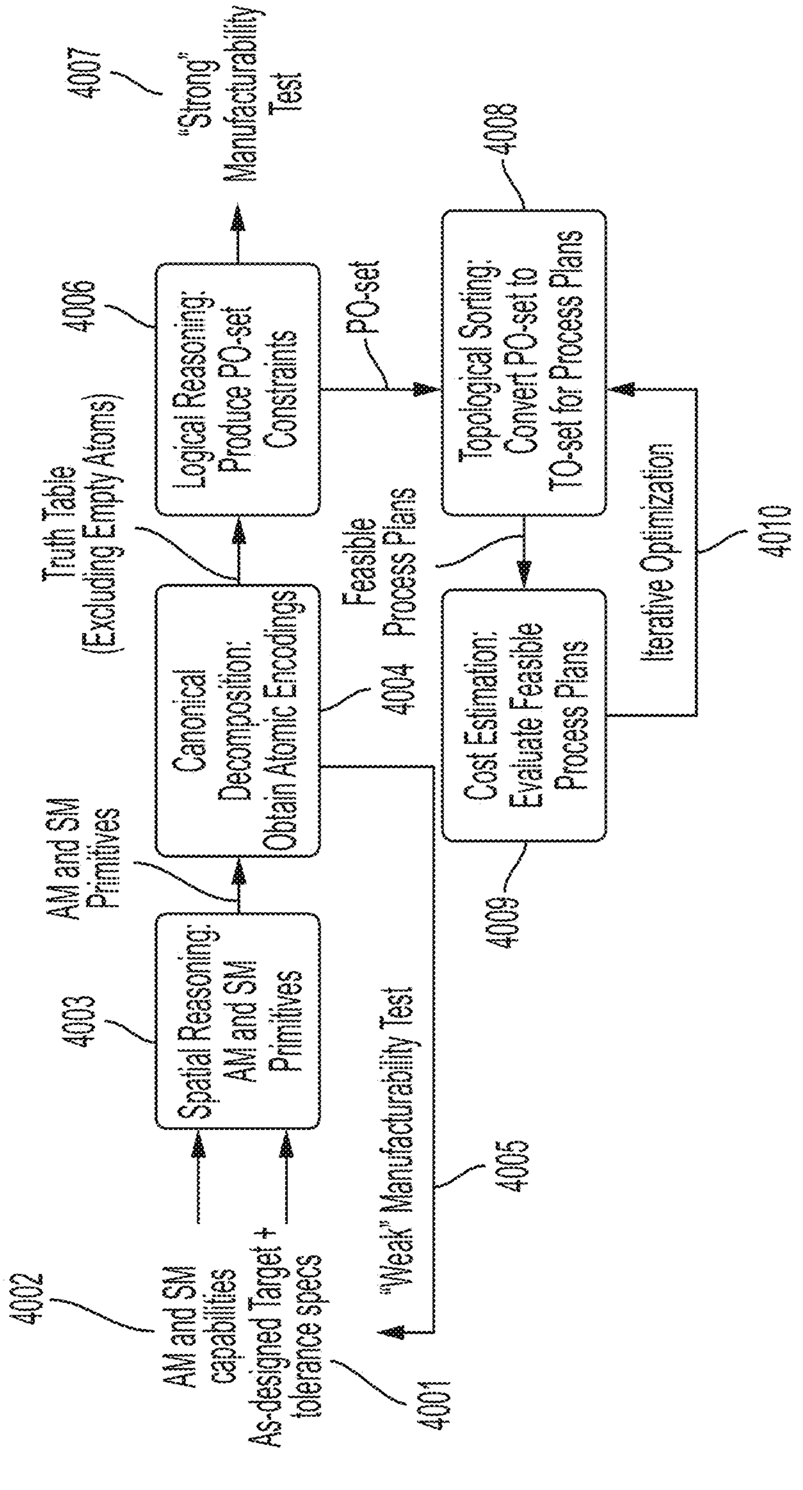

FIGS. 39 and 40 are block diagrams illustrating the workflows for two possible embodiments using "imperative" and "declarative" approaches, respectively, described earlier. The user inputs an as-designed target part 3901 and 4001 in an arbitrary geometric representation, a set of AM, SM, or both capabilities 3902 and 4002 defined by their respective machine degrees of freedom (DOF) and tool shapes including the minimum manufacturable neighborhood (MMN) shapes in arbitrary geometric representations. The spatial reasoning module 3903 and 4003 takes this input and generates any number of AM and SM primitives. One embodiment of this module was described in the commonly owned U.S. Pat. No. 10,719,069. Other embodiments are possible using specialized computer-aided drafting/computer-aided manufacturing (CAD/CAM) commercial or open-source software. The canonical decomposition module 3904 and 4004 computes intersections of these primitives and their complements to generate the atoms. The geometric shape of these atoms is only necessary for the "weak" manufacturability test 3905 and 4005 that follows; namely, checking if the union of any sub-collection of these atoms, forming a candidate as-manufactured part, is interchangeable with the as-designed part in terms (e.g., with respect to tolerance specs). In one possible embodiment, the as-designed part input 3901 and 4001 includes both the nominal shape and tolerance specs. The latter may be global tolerance zones, local tolerance zones, or surface annotations, each describing an equivalence class of shapes to which the as-manufactured shape should belong. If the test is failed, the part is deemed non-manufacturable unless either the tolerance specs are relaxed or new manufacturing capabilities 3902 and 4002 are provided, leading to new primitives computed by the spatial reasoning module 3903 and 4003. The new primitives are intersected with the old primitives to split the atoms into smaller atoms, increasing the chance of passing the test 3905 and 4005. This process may be repeated adaptively until the test is passed.

Once the "weak" manufacturability test is passed and one or more sub-collections of atoms are identified to belong to the equivalence class of the as-designed part specification 3901 and 4001, the shape of the primitives and atoms is no longer needed. From this point onward, the only information required is the inclusion of nonempty atoms against the primitives and their classification against the as-manufactured outcome (e.g., active vs. inactive atoms). This information may be encoded into a symbolic representation of the atoms as conjunctive clauses (e.g., Boolean formula using intersections of some primitives and complements of the remaining primitives). This information may also be encoded into a logical representation such as a truth table in which every atom is encoded by binary strings representing inclusion (1) or exclusion (0) against the primitives as well as the as-manufactured state. In one possible embodiment, this information is obtained by sampling, voxelization, or other tessellation of the embedding space (e.g., 2D or 3D manufacturing workspace) and performing inclusion queries for each point, voxel, or cell against the primitives and as-manufactured shape. The points, voxels, or cells with the same exact classification are grouped into atoms. Other embodiments are possible using exiting intersection computing algorithms for alternative geometric representations (e.g., B-reps).

In the "imperative" approach illustrated in FIG. 39, the truth table is passed on to the symbolic reasoning module 3906, which produces a minimal DNF from the set of nonempty atom encodings and enriches the minimal DNF by unifying it with different empty atoms. There may not exist a "strong" manufacturability test 3907 in this approach, e.g., one may have to try converting all enriched DNFs to valid process plans before knowing if any of them may work. The Boolean function learning module 3908 attempts converting different enriched to valid process plans, which will be feasible by construction, e.g., due to logical equivalence with the Boolean representation of the as-manufactured shape. Every feasible process plan may be further evaluated by a cost estimation module 3909. The space of all feasible process plans (e.g., Boolean formulae) may be explored using iterative optimization, in order to efficiently find the most cost-effective, optimal, or near-optimal formulae without having to enumerate and test every single one of them.

In the "declarative" approach illustrated in FIG. 40, the truth table is passed on to the logical reasoning module 4006, which examines only the nonempty (active and inactive) atoms one-by-one to elucidate partial order constraints that declaratively define feasible process plans as total orders subsuming these partial orders. This leads to a directed (and possibly "colored") bi-partite graph representation. A "strong" manufacturability test 4007 may be devised as a cycle-finding algorithm, checking if the graph is a DAG thus a PO-set that can be flattened to a TO-set. If the test is passed, the PO-set is passed on to the topological sorting module 4008 which generates feasible process plans, that are valid by construction, as TO-sets that subsume these PO-sets. Once again, combinatorial optimization and graph traversal algorithms (e.g., heuristic, breath- or depth-first, Dijkstra's shortest path algorithms, and A* search, as well as other planning algorithms, their variants and improvements) may be used in order to efficiently find the most cost-effective, optimal, or near-optimal formulae without having to enumerate and test every single one of them.

In one possible embodiment, the state space can be represented by another direct graph, as illustrated in FIG. 15 (geometric depiction) and FIG. 16 (logical depiction) where each node is a possible intermediate part state and every edge is a manufacturing action with a given pre-condition. One may assign each edge with the cost of that action as a distance function, thereby reducing the HM process planning to a shortest path finding problem on a the state space graph. Alternative representations of the manufacturable space are possible including directed weighted graphs where the weights represent cost, Boolean formula(s) and their corresponding tree representations (e.g., constructive solid geometry (CSG) trees), "colored" PO-set lattices or DAGs, etc.

In the "imperative" approach, the truth table includes all logical atoms, including not only nonempty (active and inactive) atoms but also empty atoms that correspond to a certain classification against primitives, encoded by a valid binary string, but do not have physical realization because certain primitives may not actually collide. In the "declarative" approach, on the other hand, one has to include only nonempty atoms in the truth table, which makes it computationally advantageous. The empty atoms may not be exactly empty, but may be small enough that the sampling or intersection algorithms miss them. Coarser the geometric resolution leads to larger number of empty atoms. Moreover, nonempty atoms that are fully contained within the tolerance zones (e.g., "almost-empty" atoms) may be treated the same way as empty atoms because their inclusion in the final state does not matter, e.g., the resulting as-manufactured shape is interchangeable with the as-designed shape with or without them. The number of almost-empty atoms increases with relaxing the tolerances. As the number of empty or almost-empty atoms increases, the "imperative" approach suffers from having to explore more enrichment scenarios, leading to enumeration of a larger number of feasible process plans. The "declarative" approach, by contrast, becomes more efficient, as it requires to process fewer nonempty atoms to come up with partial order constraints, thereby having to explore a smaller feasible space of TO-sets.

Figure 41:
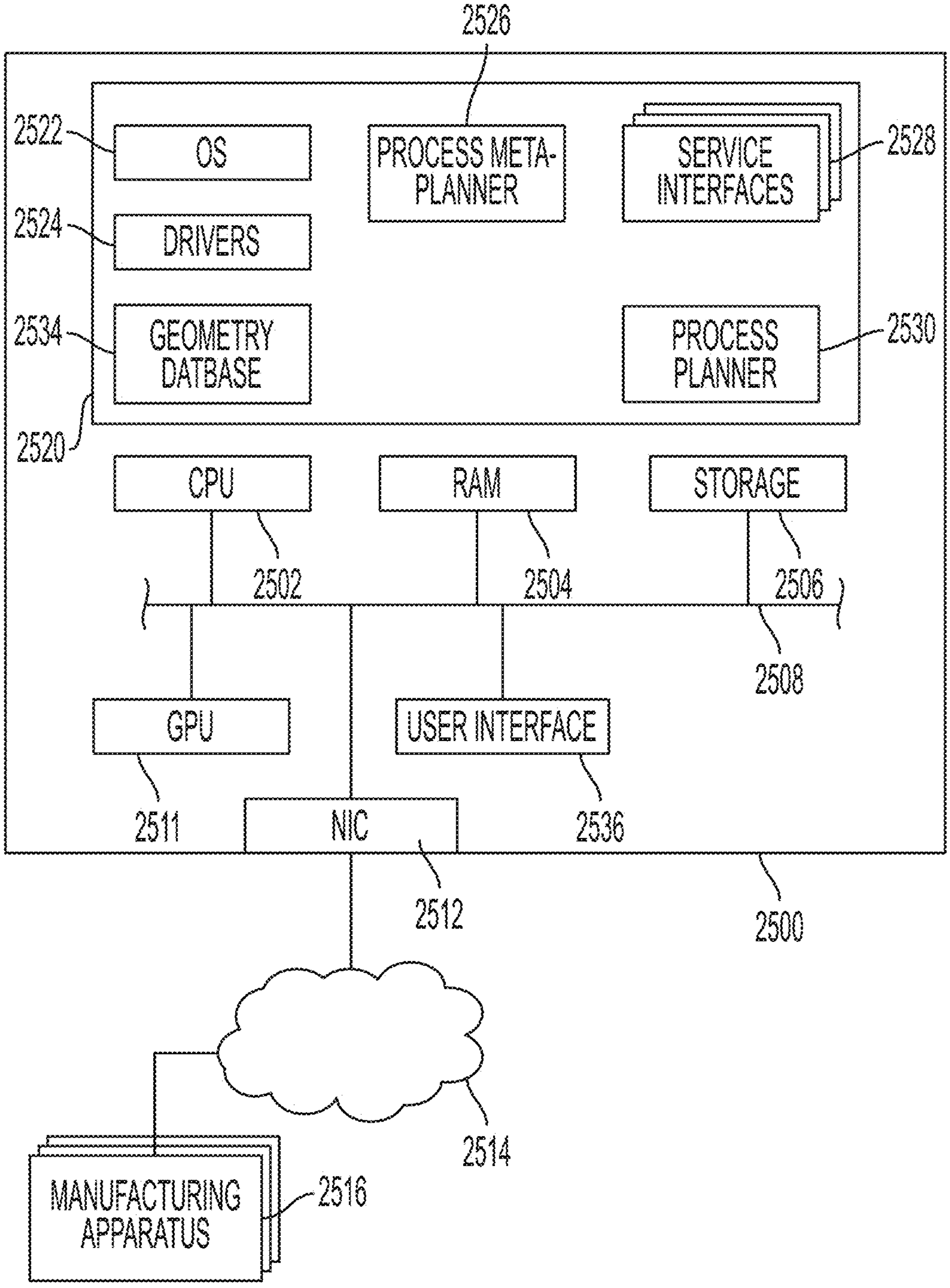
FIG. 41 is a block diagram of an apparatus according to an example embodiment.

The methods and processes described above can be implemented on computer hardware, e.g., workstations, servers, as known in the art. In FIG. 41, a block diagram shows a system and apparatus 2500 that may be used to implement methods according to an example embodiment. The apparatus 2500 includes one or more processors 2502 such as a central processing unit, co-processor, digital signal processor, etc. The processor 2502 is coupled to memory, which may include both random access memory 2504 and persistent storage 2506, via one or more input/output busses 2508. Other general-purpose or special-purpose hardware may be coupled to the bus 2508, such as graphics processing unit (GPU) 2511 and network interface 2512. Note that the functions of the apparatus 2500 described below may be implemented via a single device, e.g., a computer, or multiple devices, e.g., via client-server arrangement, clustered computing, cloud computing, etc.

The apparatus 2500 may include instructions that cause the apparatus 2500 to receive a non-geometric representation of a space of manufacturable parts with hybrid manufacturing capabilities in at least one of symbolic, logical, and combinatorial forms. At least one of a necessary, sufficient, or necessary-and-sufficient condition for manufacturability is tested by the apparatus 2500 via examining the non-geometric representation for the existence of at least one feasible process plan whose outcome is an as-manufactured part that is interchangeable with the as-designed part. The at least one feasible process plan can be communicated to a manufacturing apparatuses 2516 (e.g., via network 2514, or any other data transfer means) to produce the as-manufactured part. The manufacturing apparatuses 2516 may also be referred to herein as manufacturing instruments, and may include any additive or subtractive manufacturing device described above.

In other embodiments, the apparatus 2500 may include instructions that cause the apparatus 2500 to receive a geometric specification of an as-designed part and a set of hybrid manufacturing capabilities, e.g., of manufacturing apparatus 2516. The apparatus 2500 computes manufacturing primitives for each of the hybrid manufacturing capabilities. Each manufacturing primitive includes a region of influence (ROI) that is manufacturable through a single manufacturing action that can be performed by one of the hybrid manufacturing capabilities. The manufacturing primitives are combined via set operations to obtain a decomposition of space into atoms that are classified in terms of their inclusion against the manufacturing primitives. A non-geometric representation of a space of manufacturable parts is produced by the apparatus 2500 that can be manufactured by the hybrid manufacturable capabilities in at least one of symbolic, logical, and combinatorial forms.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A computer-implemented method comprising:
- providing a computer with a geometric specification of an as-designed part and a set of hybrid manufacturing capabilities;
- computing manufacturing primitives for each of the hybrid manufacturing capabilities, each manufacturing primitive comprising a region of influence that is manufacturable through a single manufacturing action that can be performed by one of the hybrid manufacturing capabilities;
- combining the manufacturing primitives via set operations to obtain a decomposition of space into atoms that are classified in terms of their inclusion against the manufacturing primitives; and
- producing a non-geometric representation of a space of manufacturable parts that can be manufactured by the hybrid manufacturable capabilities in at least one of symbolic, logical, and combinatorial forms.

2. The method of claim 1, further comprising testing a necessary condition for manufacturability of the as-designed part by manufacturing instruments of the hybrid manufacturing capabilities via matching the as-designed part with a union of at least one sub-collection of the atoms.

3. The method of claim 2, wherein the geometric specification of the as-designed part specifies an equivalence class of interchangeable shapes and the necessary condition for manufacturability is that the union of at least one sub-collection of the atoms belongs to the equivalence class.

4. The method of claim 3, wherein the geometric specification includes a nominal shape and tolerance specifications and interchangeability is defined by matching with the nominal shape up to the specified tolerances.

5. The method of claim 1, wherein the non-geometric representation of the space of manufacturable parts comprises a directed graph corresponding to state transitions.

6. The method of claim 1, wherein the non-geometric representation of the space of manufacturable parts comprises a truth table with binary encoding of the atoms.

7. The method of claim 1, wherein the non-geometric representation of the space of manufacturable parts comprises one or more Boolean formulas in terms of the primitives or their tree representations, partially-ordered sets (PO-sets), and directed graphs corresponding to primitive order relations.

8. The method of claim 1, wherein the non-geometric representation of the space of manufacturable parts comprises partially-ordered sets (PO-sets).

9. The method of claim 1, wherein the non-geometric representation of the space of manufacturable parts comprises directed graphs corresponding to primitive order relations.

10. A system comprising:

one or more manufacturing instruments with the hybrid manufacturing capabilities; and a computer operable to perform the method of claim 1, wherein a process plan is formed for a part from the space of manufacturable parts and a definition of the part is transmitted from the computer to the one or more manufacturing instruments for production.

11. A computer-implemented method comprising:

providing a computer with a non-geometric representation of a space of manufacturable parts with hybrid manufacturing capabilities in at least one of symbolic, logical, and combinatorial forms;

testing at least one of a necessary, sufficient, or necessary-and-sufficient condition for manufacturability via examining the non-geometric representation for at least one feasible process plan whose outcome is an as-manufactured part that is interchangeable with an as-designed part; and communicating the at least one feasible process plan to a manufacturing apparatus to produce the as-manufactured part.

12. The method of claim 11, further comprising:

providing the computer with a cost model;

generating by the computer the at least one feasible process plan from the non-geometric representation; and based on the cost model, evaluating by the computer the cost of the at least one feasible process plan.

13. The method of claim 12, wherein:

the cost model is given in terms of primitive cost factors and atom cost shares;

a cost for the at least one feasible process plan is determined by a total cost for manufacturing actions within the process plan;

a cost for each manufacturing action is determined by a total of costs for the actual added or removed atoms within a region of influence or primitive of that action; and a cost for addition or removal of an atom is determined by the primitive cost factor of the atom multiplied by an atom cost share of the atom.

14. The method of claim 11, wherein the non-geometric representation is a Boolean formula in terms of symbolic primitives in disjunctive normal form (DNF) and the test for manufacturability comprises checking for at least one Boolean formula, corresponding to the at least one feasible process plan, that is conditionally equivalent to the DNF.

15. The method of claim 14, further comprising producing at least one enriched DNF from a minimal DNF and performing Boolean function learning to convert the enriched DNF to at least one Boolean formula corresponding to the at least one feasible process plan.

16. The method of claim 11, wherein the non-geometric representation is a collection of partial order constraints represented by an ordinary or colored directed bi-partite graph and the test for manufacturability comprises checking that the graph is acyclic.

17. The method of claim 16, further comprising producing at least one totally-ordered set (TO-set) corresponding to the at least one feasible process plan, from at least one partially-ordered set (PO-set), generated from the partial order constraints and represented by a directed acyclic graph (DAG), by topological sorting or flattening of the DAG.

18. The method of claim 16, wherein deriving the partial order constraints comprises the following rules regarding a given atom being inside or outside additive and subtractive manufacturing (AM/SM) primitives and being active or inactive in a given target as-manufactured collection of atoms:

for every active atom, there exists at least one AM primitive including the active atom and appears after every SM primitive including the active atom in the ordering; and for every inactive atom, there exists at least one SM primitive including the inactive atom and appears after every AM primitive including the inactive atom in the ordering.

19. A system comprising:

one or more manufacturing instruments with the hybrid manufacturing capabilities; and a computer operable to perform the method of claim 11, wherein the at least one feasible process plan is transmitted from the computer to the one or more manufacturing instruments for production of the as-manufactured part.

* * * * *